(12) United States Patent
Sheridan et al.

(10) Patent No.: US 6,725,032 B1
(45) Date of Patent: Apr. 20, 2004

(54) CELL NETWORK MANAGEMENT SYSTEM

(75) Inventors: Joseph Allen Sheridan, Overland Park, KS (US); John Kenneth Woods, Kansas City, MO (US)

(73) Assignee: CeleritasWorks, LLC, Overland Park, KS (US)

( * ) Notice: Subject to any disclaimer, the term of this patent is extended or adjusted under 35 U.S.C. 154(b) by 0 days.

(21) Appl. No.: 09/414,746

(22) Filed: Oct. 8, 1999

(51) Int. Cl.[7] ................................................ H04M 3/00
(52) U.S. Cl. ...................... 455/419; 455/67.11; 455/424
(58) Field of Search ................... 455/419, 420, 455/67.1, 423, 424, 560, 9, 67.11, 67.7

(56) References Cited

U.S. PATENT DOCUMENTS

| | | | |
|---|---|---|---|
| 5,274,768 A | 12/1993 | Traw et al. ................. 395/275 |
| 5,285,494 A | 2/1994 | Sprecher et al. .............. 379/59 |
| 5,329,470 A | 7/1994 | Sample et al. .............. 364/578 |
| 5,568,471 A | 10/1996 | Hershey et al. ................ 370/17 |
| 5,726,979 A | 3/1998 | Henderson et al. .......... 370/254 |
| 5,799,154 A | 8/1998 | Kuriyan ................. 395/200.53 |
| 5,867,495 A | 2/1999 | Elliott et al. ................ 370/352 |
| 5,896,369 A | 4/1999 | Warsta et al. ................ 370/338 |
| 5,896,568 A | 4/1999 | Tseng et al. ................. 455/422 |
| 5,913,164 A | 6/1999 | Pawa et al. .................. 455/427 |
| 5,917,817 A | 6/1999 | Dunn et al. .................. 370/352 |
| 5,956,331 A | 9/1999 | Rautiola et al. ............. 370/338 |
| 5,974,135 A | 10/1999 | Breneman et al. ........... 379/265 |
| 5,987,306 A | * 11/1999 | Nilsen et al. ............... 455/67.1 |
| 6,131,031 A | * 10/2000 | Lober et al. ................. 455/444 |

OTHER PUBLICATIONS

Khetarpal, R., et al., "SMART—A Solution for Managing the Capacity, Growth, and Performance of Wireless Networks," Bell Labs Technical Journal, US, Bell Laboratories, vol. 2, No. 3, Jun. 21, 1997, pp. 182–193.

* cited by examiner

Primary Examiner—Lee Nguyen
(74) Attorney, Agent, or Firm—Lathrop & Gage LC

(57) ABSTRACT

A cell network management system comprises a user interface with navigation components and screen components, a web server component, and a database component. A workstation connects to the web server component via a browser. The user interface transmits configuration data to the workstation in the form of hypertext markup language. The workstation uses the navigation components to navigate through screen components displaying different levels of configuration data.

38 Claims, 22 Drawing Sheets

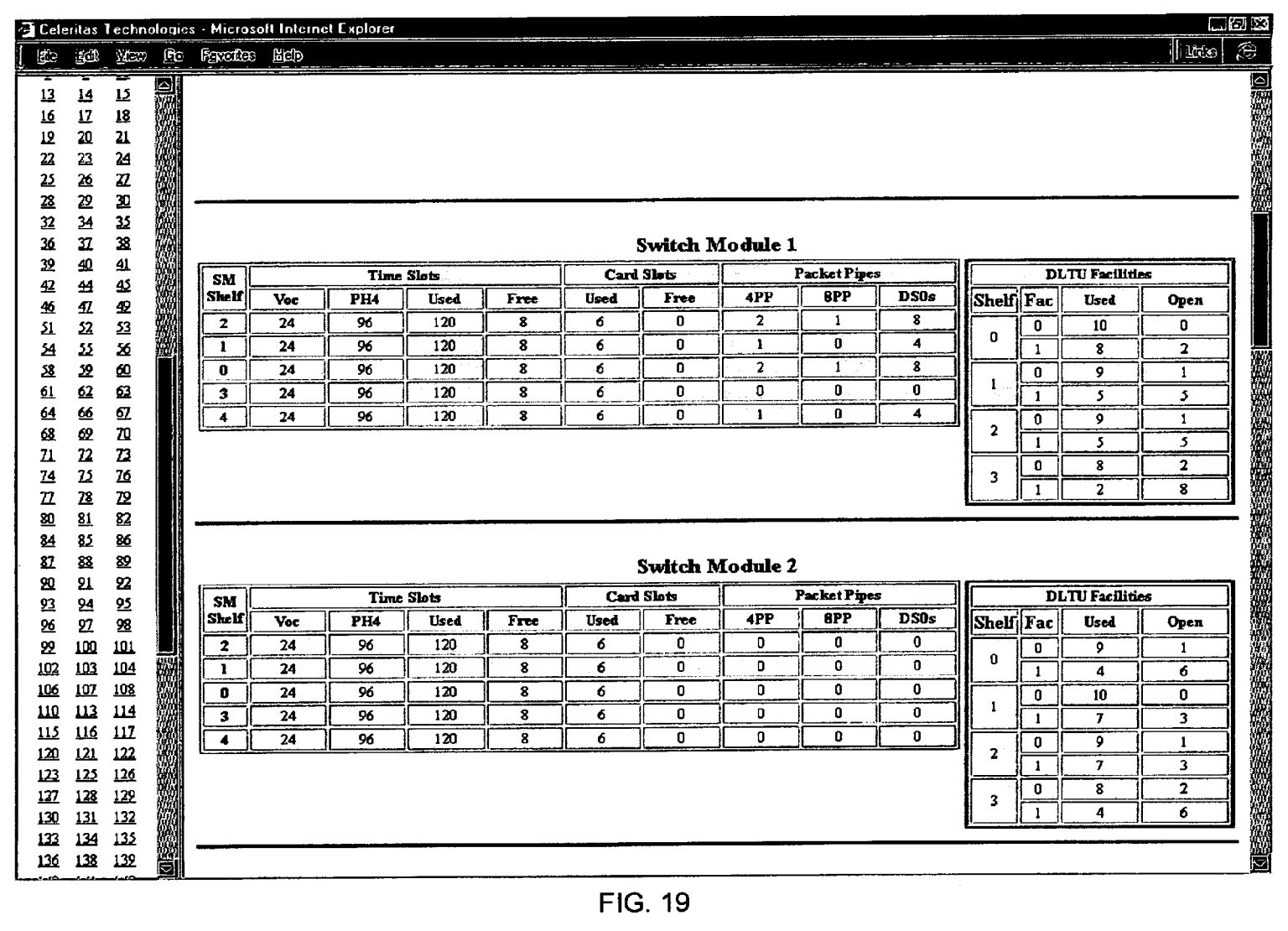

Switch Module 1

| SM Shelf | Time Slots | | | Card Slots | | Packet Pipes | | |
|---|---|---|---|---|---|---|---|---|
| | Voc | PH4 | Used | Free | Used | Free | 4PP | 8PP | DS0s |
| 2 | 24 | 96 | 120 | 8 | 6 | 0 | 2 | 1 | 8 |
| 1 | 24 | 96 | 120 | 8 | 6 | 0 | 1 | 0 | 4 |
| 0 | 24 | 96 | 120 | 8 | 6 | 0 | 2 | 1 | 8 |
| 3 | 24 | 96 | 120 | 8 | 6 | 0 | 0 | 0 | 0 |
| 4 | 24 | 96 | 120 | 8 | 6 | 0 | 1 | 0 | 4 |

| Shelf | DLTU Facilities | | |
|---|---|---|---|
| | Fac | Used | Open |
| 0 | 0 | 10 | 0 |
| | 1 | 8 | 2 |
| 1 | 0 | 9 | 1 |
| | 1 | 5 | 5 |
| 2 | 0 | 9 | 1 |
| | 1 | 5 | 5 |
| 3 | 0 | 8 | 2 |
| | 1 | 2 | 8 |

Switch Module 2

| SM Shelf | Time Slots | | | Card Slots | | Packet Pipes | | |
|---|---|---|---|---|---|---|---|---|
| | Voc | PH4 | Used | Free | Used | Free | 4PP | 8PP | DS0s |
| 2 | 24 | 96 | 120 | 8 | 6 | 0 | 0 | 0 | 0 |
| 1 | 24 | 96 | 120 | 8 | 6 | 0 | 0 | 0 | 0 |
| 0 | 24 | 96 | 120 | 8 | 6 | 0 | 0 | 0 | 0 |
| 3 | 24 | 96 | 120 | 8 | 6 | 0 | 0 | 0 | 0 |
| 4 | 24 | 96 | 120 | 8 | 6 | 0 | 0 | 0 | 0 |

| Shelf | DLTU Facilities | | |
|---|---|---|---|
| | Fac | Used | Open |
| 0 | 0 | 9 | 1 |
| | 1 | 4 | 6 |
| 1 | 0 | 10 | 0 |
| | 1 | 7 | 3 |
| 2 | 0 | 9 | 1 |
| | 1 | 7 | 3 |
| 3 | 0 | 8 | 2 |
| | 1 | 4 | 6 |

FIG. 19

CELL NETWORK MANAGEMENT SYSTEM

FIELD OF THE INVENTION

The present invention relates to the field of cell network configuration and management.

BACKGROUND OF THE INVENTION

Managing cell sites is a complex task. Each cell site has multiple components, including an antenna, a base transceiver, and a switch. Cellular transmissions are sent and received at the antenna and communicated between the antenna and base transceiver. Also, signaling and communications are transmitted between the base transceiver and the switch. The switch then is able to send and receive transmissions to and from a public switch telephone network (PSTN).

Multiple components are configured in each of the cell site base transceiver and the switch so that signaling and communications can be switched between the cell sites and other cell sites and between the cell sites and the PSTN. Many of these components are manually configured, and the component configuration is not easily and readily determined. Therefore, an improved system is needed to manage and configure cell site complexes.

SUMMARY OF THE INVENTION

The invention comprises a system for managing a cell network, the system comprising a cell site complex having a configuration and configuration data associated with the configuration. A cell network management system is configured to receive the configuration data from the cell site complex and to transmit the configuration data using a hypertext markup language upon receiving a request. A workstation is configured to connect to the cell network with a browser, to transmit the request, and to receive the configuration data in the hypertext markup language.

BRIEF DESCRIPTION OF THE DRAWINGS

FIG. 19 is a screen view of a continuation of the switch screen of FIG. 18 in accordance with an embodiment of the present invention.

DETAILED DESCRIPTION OF THE PREFERRED EMBODIMENTS

The present invention provides a system for managing a cell switch and its associated cell site complex components. This system displays to a user the parameters of the components in the cell site complex and the configuration of the hardware components. In addition, this system allows the user to set the configurable parameters and components.

Figure 1:
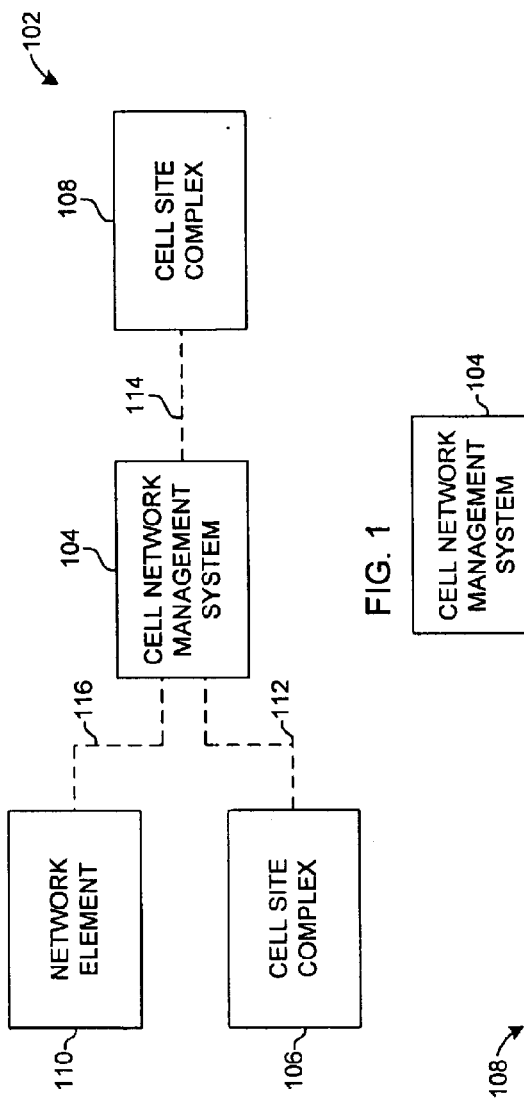
FIG. 1 is a block diagram of a cell management system in accordance with an embodiment of the present invention.

FIG. 1 illustrates an exemplary embodiment of the network management system 102 of the present invention. The network management system 102 comprises a cell network management system (CNMS) 104 connected to first and second cell site complexes 106 and 108 and a network element 110 connected to the CNMS 104 by links 112, 114, and 116, respectively.

A call has communications and signaling. Communications contain caller information, such as voice. Signaling includes public and private messages and contains information that facilitates call processing and connection. Links are used to transport data and signaling. As used herein, the term "link" means a transmission media used to carry data and signaling. For example, a link could be internet protocol (IP) based, ethernet, TCP/IP based, via digital signal 0 (DS0), DS1, or greater DS levels, or via any other protocol medium. Connections are used to transport communications.

The CNMS 104 receives signaling and communications, including configuration data, performance data, alarm data, and call connection data (collectively referred to as "configuration data"), for each of the components in the cell site complexes 106 and 108 and the network element 110. If necessary, the CNMS 104 formats the received data for storage in an associated database. The CNMS 104 organizes the data contained within the communications and provides a visual representation of that data to a user so that the configuration of parameters and components may be determined. The CNMS 104 may be used to reset or configure any of the parameters or components within the cell site complexes 106 and 108 without the user physically being present at the cell site complex. Alarms are reported when parameters are outside of an allowable range, when components are configured outside of allowable specifications, or when parameters or component configurations become outside of allowable ranges and specifications.

The cell site complexes 106 and 108 comprises one or more switches each connected to one or more cell sites. The cell site complexes 106 and 108 send and receive cellular (wireless) communications. Some cell site complexes may be configured also to send and receive wireline communications, such as over a public switched telephone network (PSTN). For each of the communications received, the cell site complex 106 or 108 may receive and process signaling to determine how to connect the communications. The cell site complexes 106 and 108 then connect the communications through either the cell network or the PSTN.

The network element 110 comprises a local exchange carrier (LEC) switch, an interexchange carrier (IXC) switch, a tandem switch, a service platform, a legacy based information system, another cell site, or any other device capable of transmitting or receiving communications or signaling to or from the CNMS 104. A service platform can be, for example, a computer platform capable of processing calls. Examples of service platforms include operator services platforms, directory assistance platforms, prepaid call processing platforms, voice mail platforms, and digital services unit platforms.

Figure 2:
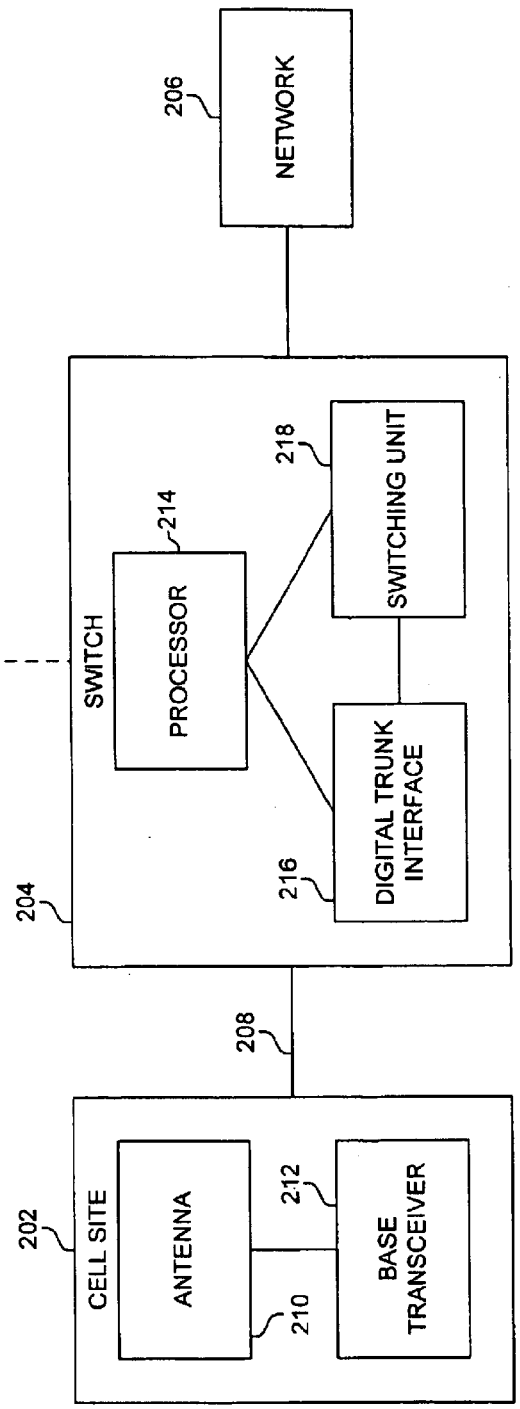
FIG. 2 is a block diagram of an expanded cell site complex in accordance with an embodiment of the present invention.

FIG. 2 illustrates an exemplary embodiment of the cell network management system 104 linked to an expanded cell site complex 108. The cell site complex 108 comprises a cell site 202, a switch 204, and a network 206.

The cell site 202 transmits and receives wireless communications and signaling. The cell site 202 also transmits and receives communications and signaling to and from the switch 204 over a connection 208. The connection 208 can be any wireline connection, such as a DS1 (also referred to as a T1) or another transmission medium. The cell site 202 comprises an antenna 210 and a base transceiver (BT) 212.

The antenna 210 transmits and receives the wireless communications and signaling, if any. Typically, an antenna 210 may have three sectors from which the communications are transmitted or at which they are received using a single radio frequency. Therefore, the antenna 210 will transmit and receive in three sectors.

The BT 212 processes any signaling and determines which communications and signaling are transmitted to and from the cell site 202 either as wireless communications or wireline communications over the connection 208 to the switch 204. In addition, the BT 212 controls the conversion between wireless communications and wireline communications that can be transmitted over the connection 208.

The switch 204 of FIG. 2 controls the call processing for the cell site complex 108. The switch 204 processes signaling and switches communications between the cell site 202 and the network 206. The switch 204 of FIG. 2 comprises a processor 214, a digital trunk interface (DTI) 216, and a switching unit 218.

The processor 214 receives, processes, and transmits signaling. The processor 214 selects connections for communications, thereby determining how a call will be switched between the cell site 202 and the network 206.

The DTI 216 terminates the connection 208 at the switch 204. The DTI 216 is the point at which the trunk groups from the T1 tie into the switch 204 prior to being split into groups of DS0s.

The switching unit 218 provides originating and terminating points for digital and analog connections to and from the switch 204. The switching unit 218 converts communications between digital and analog and makes connections for communications being transferred between the cell site 202 and the network 206.

Figure 3:
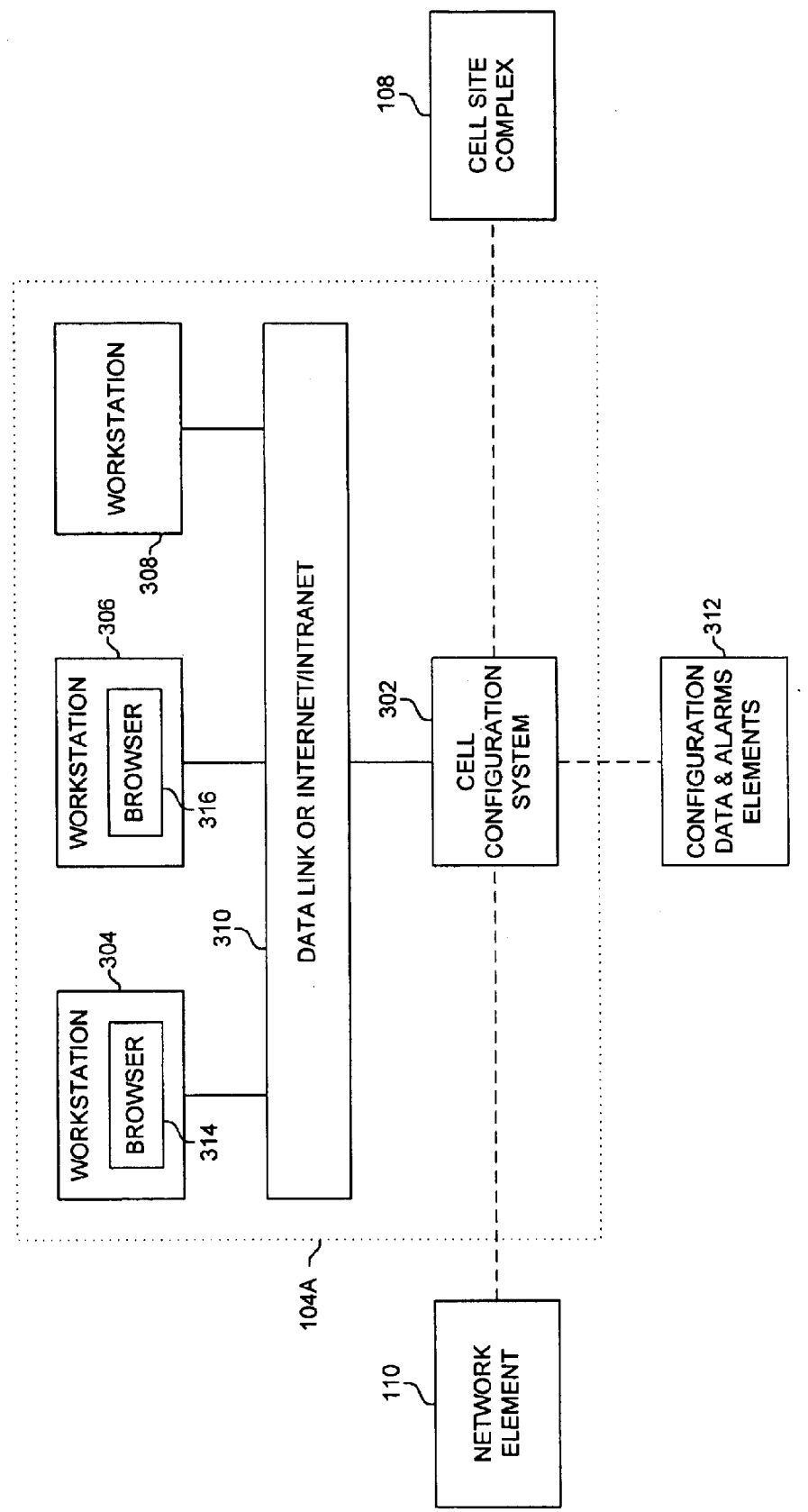
FIG. 3 is a block diagram of an expanded cell network management system in accordance with an embodiment of the present invention.

FIG. 3 illustrates an exemplary embodiment of a CNMS 104A. The CNMS 104A comprises a cell configuration system 302 connected to work stations 304–308 via a data link 310. Configuration data and alarm elements 312, the cell site complex 108 and the network element 110 are connected to the cell configuration system 302 via links.

The cell configuration system 302 receives signaling including configuration data, from the cell site complex 108, the network element 110, and the configuration data and alarms elements 312. The cell configuration system 302 formats data if necessary for storage in a database. The cell configuration system 302 also transmits signaling, including configuration data and instructions for configuration to the cell site complex 108, the network element 110, and the configuration data and alarms elements 312.

The cell configuration system 302 also receives signaling, including configuration instructions and other requests, from the work stations 304–308, processes the signaling, and transmits signaling, including configuration data and other responses, to the work stations. The cell configuration system 302 controls all user applications for the work stations 304–308 and provides a user interface to the work stations so that users may configure parameters and components of the cell site complex 108 and network element 110 and may view configuration data from the cell site complex, the network element, and the configuration data, and alarms elements 312.

The user interface application is a frame based application that displays internet protocol (IP) based hypertext mark-up language (HTML) screens to user. HTML is a programming language that defines how information is displayed by a browser. The user interface frame based application has multiple levels through which a user can navigate via HTML links to other pages. Navigation components, via HTML links and other navigation tools, provide quick and easy configuration data display and configuration data entry.

The user interface provided by the cell configuration system 302 is browser-based. Therefore, instructions from a browser provide navigation through user interface screens and navigation components provided by the cell configuration system.

Further, the user interface of the cell configuration system 302 graphically displays the switch configuration data so that entries may be made to configure parameters and components for a switch or other element of the cell site complex 108 without physically being present at the cell site complex. If parameters or components of the cell site complex 108 are configured to be outside a range of permissible parameter or component specifications, an alarm will be reported via a report that can be generated or reported to the user in real time or near real time.

The work stations 304–308 comprise a processor, an input device such as a keyboard, and an output device such as a monitor. Some work station configurations may include only an input device and an output device, such as a dumb terminal.

The work stations 304–308 are used to transmit signaling, such as configuration data or other requests, to the cell configuration system 302 and to receive signaling such as configuration data or other responses, from the cell configuration system. The work stations 304–308 display the screens from the user interface to a user and provide for navigation of the screens and data entry.

The work stations 304–306 each comprise a browser 314–316. A browser is a tool used to navigate and access IP based information. The browsers 314–316 use the hypertext transfer protocol (HTTP) to communicate with the cell configuration system 302 over the data link 310. HTTP is a protocol for transferring HTML documents from a server to a browser across intranets or the internet. The browsers 314–316 provide the ability to access and transfer configuration data via HTML pages. Examples of browsers include the Microsoft Internet Explorer brand browser and the Netscape Navigator brand browser.

The data link 310 is configured to transmit signaling between the cell configuration system 302 and the work stations 304–308. Preferably, the data link 310 comprises an internet or intranet-based link. However, other data links may be used.

The configuration data and alarms elements 312 comprise network elements that transmit configuration data or alarm data to the cell configuration system 302 or receive configuration data or alarm data from the cell configuration system. Configuration data and alarms elements 312 may comprise LEC switches, IXC switches, management systems for switches, billing systems, performance monitoring systems, or other legacy systems.

The system of FIG. 3 operates as follows. The cell configuration system 302 receives configuration data from the cell site complex 108, the network element 110, and the configuration data and alarms element 312. A user of a work station 304 opens a browser and enters the HTTP address to achieve a connection to the cell configuration system 302 over the data link 310. Once the work station 304 has connected to the cell configuration system 302, the cell configuration system will transmit the switch configuration data in the form of HTML pages to the work station 304. The work station 304 may navigate through the configuration data by selecting hypertext links or by using navigation tools provided on each HTML page. A selection on a HTML hypertext link will initiate navigation to a different HTML page containing different configuration data.

In another example, a user of a work station 304 initiates a connection to the cell configuration system 302 by opening a browser 314 and entering an HTTP address of the cell configuration system. After a connection is made between the work station 304 and the cell configuration system 302, the cell configuration system transmits signaling to the work station in the form of HTML pages containing configuration data. The configuration data provides a graphical representation of the parameter and component configurations of the cell site complex 108.

A user determines that the components of the cell site complex 108 should be re-configured. The user of the work station 304 enters new configuration data for a component of the cell site complex such as for the switching unit 216 of FIG. 2. Signaling is transmitted from the work station 304 to the cell configuration system 302 in the form of an HTML page containing configuration data. The cell configuration system 302 processes the signaling, saves the configuration data in a database, and transmits the configuration data to the cell site complex 108. The cell site complex 108 uses the configuration data to reconfigure the switching unit 216 according to the parameters specified in the configuration data.

Figures 4, 5, 6:
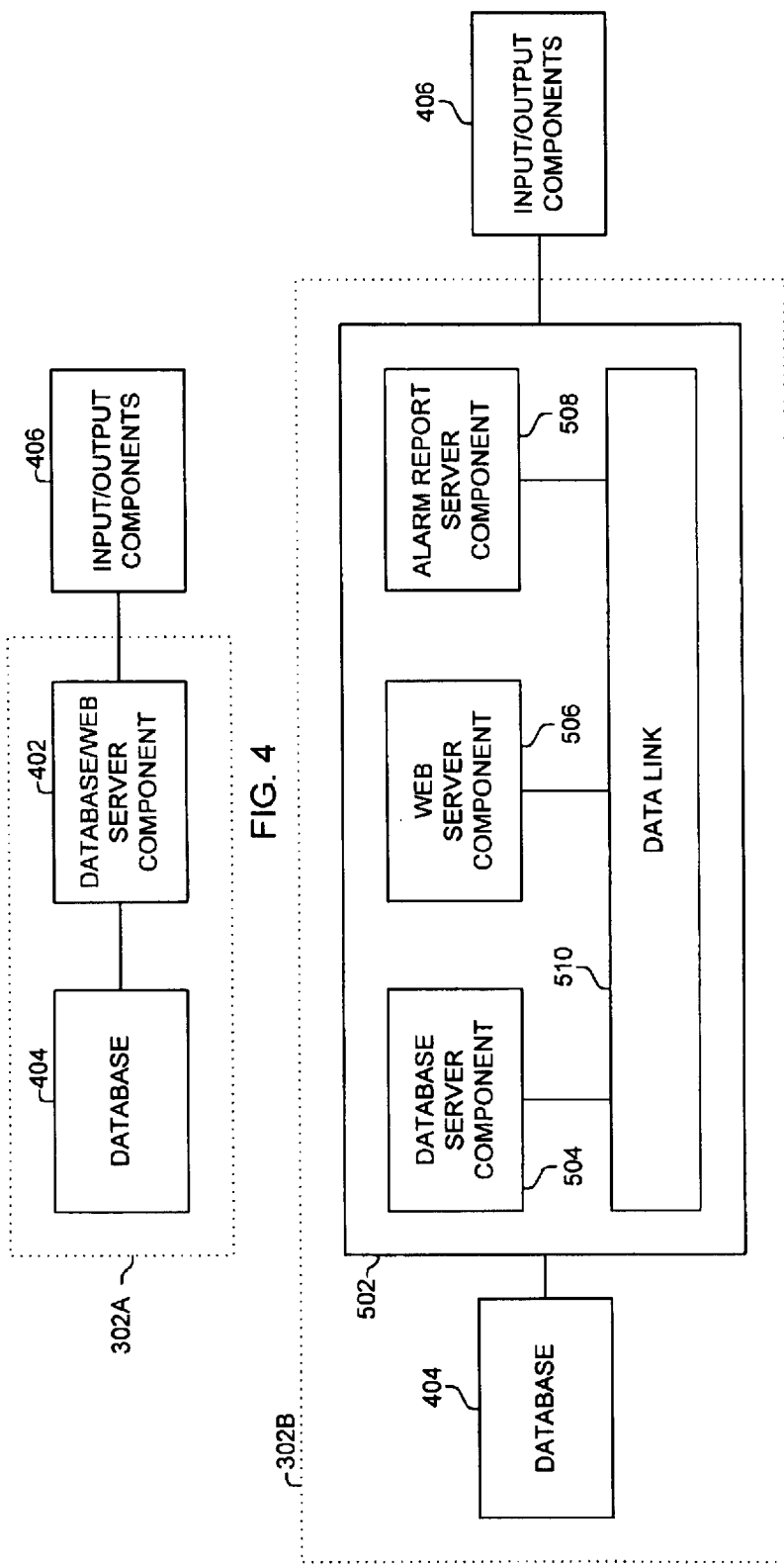
FIG. 4 is a block diagram of an expanded cell network management system in accordance with an embodiment of the present invention.
FIG. 5 is a block diagram of another expanded cell network management system in accordance with an embodiment of the present invention.
FIG. 6 is a block diagram of logical components of a cell network management system in accordance with an embodiment of the present invention.

FIG. 4 illustrates an exemplary embodiment of a cell configuration system 302A. The cell configuration system 302A comprises a database/web server component 402 connected to a database 404 and an input/output components 406. It will be appreciated that the input/output components 406 are optional and not required.

The database/web server component 402 receives signaling, including configuration data, HTML pages, and other requests, processes the signaling, and transmits signaling, including configuration data, HTML pages, and other responses. The database/web server component 402 formats data if necessary, and stores the data in database 404. In addition, the database/web server component 402 retrieves data from the database 404 for transmission.

The database 404 stores configuration data. This data includes switch data, cell site data, and data associated with the structure and functionality of the cell configuration system 302A, including the user interface.

The input/output components 406 comprise a monitor, a keyboard, a printer, a modem and other connection devices, a mouse, a trackball, a touch pad, a joy stick, or any other input device or output device for transmitting signaling, including configuration data, to or from the database/web server component 402.

FIG. 5 illustrates an exemplary embodiment of another expanded cell network management system 302B. The embodiment of FIG. 5 is an example of another way in which hardware components may be provided to implement the applications of the CNMS 104. The cell configuration system 302B comprises a processor 502 configured to receive signaling, including requests, process the signaling, and transmit signaling, including configuration data, to the workstations 304–308, the cell site complexes 106 and 108, and the network element 110.

The processor 502 of FIG. 5 comprises a database server component 504, a web server component 506, and an alarm report server component 508. It will be appreciated that the server components 504–508 and the applications can be implemented as one or more physical components.

The database server component 504 receives configuration data, formats configuration data, if necessary, stores configuration data in the database 404, and retrieves configuration data from the database. The database server component 504 communicates with the web server component 506 and the alarm report server 508 through the datalink 510.

The web server component 506 processes any signaling, including configuration data, associated with requests from, or transmissions to, an internet or intranet (collectively internet protocol or IP) application. The web server component 506 processes HTML signaling from the workstations 304–308 and responds to the workstations with HTML responses so that configuration data is provided to a user.

The alarm server component 508 processes configuration data and determines if any parameter or component is configured outside of an allowable range or specification that is set for that parameter or component. The alarm report server component 508 reports an alarm for any parameter or component that is improperly configured. The alarm can be transmitted to the workstations 304–308 for viewing by a user or can be sent to a printable report.

The data link 510 can be any link that transmits signaling between the database server component 504, the web server component 506, and the alarm report server component 508. Preferably, the data link 510 is a wide area network (WAN) using TCP/IP. However, other implementations may be used. Additionally, other local area networks (LANs) may be used.

FIG. 6 illustrates an exemplary embodiment of components for the cell configuration system 302C. The cell configuration system 302C of FIG. 6 comprises a data reception and storage system 602, a user interface 604, a security system 606, and an alarm reporting system 608.

The data reception and storage system 602 receives and transmits configuration data from the cell site complex 108, the network element 110, and the configuration data and alarms elements 312. The data reception and storage system 602 uses several data sources to obtain current configuration data. These sources include, for example, components of the switch 204, such as data from the processor 212, data from the digital trunk interface 214, and data from the switching unit 216. Other data is received from the cell site 202, the network element 110 or the configuration data and alarms elements 312.

The data reception and storage system 602 analyzes the configuration data for errors, completes other processing and reformatting if necessary, and loads the data to the database 404 (see FIG. 4). The data reception and storage system 602 parses the configuration data down to its basic data components. This process facilitates easy loading of the data into the database 404.

The data reception and storage system 602 analyzes the configuration for violations of any configuration rules. For example, configuration errors will be reported if DS0 groups from a same DS1 terminate at the same location of the switching unit 216, if a DS0 group is assigned to the control component of the base transceiver 210, or if a DS0 group assigned to carry communications between the base transceiver 210 and the switch 204 is of insufficient size to handle the communications capacity. Other configuration rules may exist.

The data reception and storage system 602 optionally may be configured with temporary load tables that retain static information from current configurations. The temporary load tables may be used to hold configuration data until the configuration data can be analyzed for configuration errors. Once the temporary load tables have been analyzed for configuration errors, the configuration data is stored in the database 404 to represent actual configurations.

The user interface 604 transmits to a user HTML screens that display the configuration of the components and subcomponents of the cell site complex 108. The user interface 604 is a browser-enabled system that uses hypertext links to allow a user to select a component on an HTML page and view the selected component. A user may easily navigate through the HTML screens by using the hypertext links.

The user interface 604 generates the HTML screens dynamically based upon the requested configuration data and transmits the HTML screens to a user. The dynamic HTML screens may change in content with every request from a user, depending on the configuration dated to be displayed.

The security system 606 performs login security, session and time out security, page security, group security, user security, market security, and check module security. Login security confirms that a work station is logged into the configuration management system 302 after the work station has accessed to a secure page. Login security compares a login name and password provided by a work station user with a stored list of login names and passwords to determine if access will be given to the user of the work station. Login security confirms that the login name and password are valid for each HTML page that is loaded.

Session and time out security monitors users to make sure they have accessed secure pages within ninety minutes. If a session has not been accessed in the last ninety minutes, access to the configuration management system 302 will be terminated. Each secure screen will contain the session and time out security mechanism.

Page security is maintained for each screen in the user interface 604. Different users or groups can have different levels of access for the various screens in the user interface 604. In addition, user access can be limited to only reading configuration data for a particular screen, or the user can be provided read and write access.

Group security is used to customize access levels that a user will have to secure screens. Groups may be created, deleted, and modified through the use of the group security.

User security is used to further customize screen access for each user. For each access level, options may be selected to allow or deny access.

Market security is used to provide access for groups and users to specific markets, without allowing those groups or users to have access to other markets. Market security is defined at the user level and the group level.

Check module security checks the login security, the session and time out security, the group security, the market security, and the page security. If a user has not logged in properly, the user will not be allowed to access the system or specific pages or markets.

The alarm reporting system 608 generates configuration error alarms. The alarm reporting system 608 causes all errors of a specific component and its subcomponents to be displayed to a user or to be generated to a report. For each error, the severity, error type, and a description of the error will be displayed. If the component is represented by a user interface screen or function, a link to that component's screen or function is generated in the configuration error report.

Figure 7:
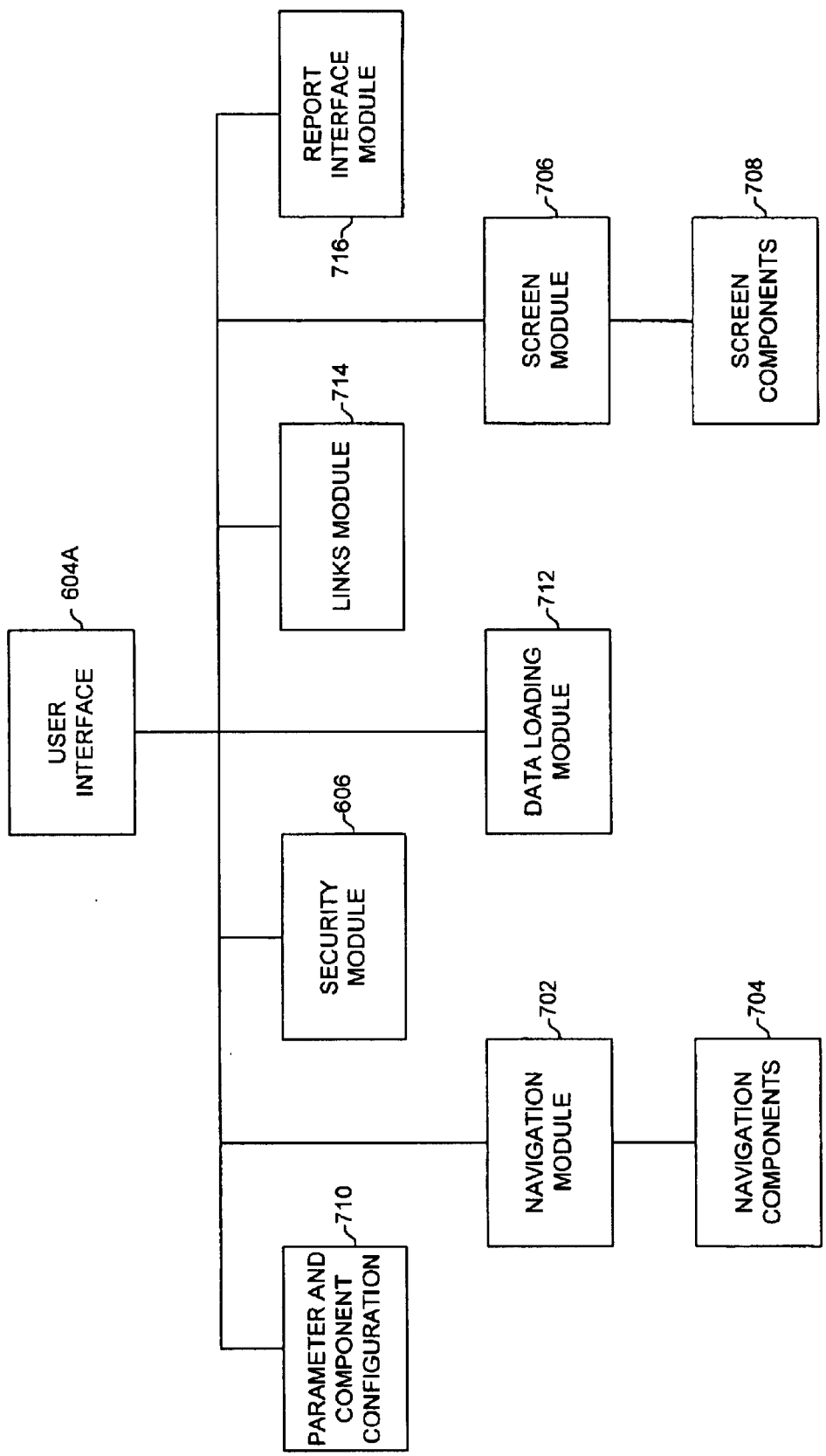
FIG. 7 is a block diagram of a user interface in accordance with an embodiment of the present invention.

FIG. 7 illustrates an exemplary embodiment of a user interface 604A. The user interface 604A comprises a navigation module 702 having navigation components 704, a screen module 706 having screen components 708, a parameter and equipment configuration module 710, a data loading module 712, a links module 714, and a report interface module 716. In addition, the user interface 604A includes the security 606 described above for page and user access security. It will be appreciated that greater, fewer, or other components may be used.

The navigation module 702 provides links and access components so that a user can navigate between the screens of the user interface 604A. The navigation module 702 comprises a navigation frame that is displayed on a portion of the screen frame. A frame is a visual text area located in a browser window of a screen or page displayed to a user that allows separation of information for that text area. Thus, the navigation frame is an area located in the browser window that displays navigation tools and navigation components that may be used by a user to navigate between the screens of user interface 604A and to configure information for components and subcomponents of the cell site complexes 106 and 108.

The navigation module 702 also comprises selectable screen components or graphics that represent components from the cell site complexes 106 and 108. When a user selects one of the selectable components, a new screen having additional data for that selected component is displayed to the user. The act of selecting these components to provide additional information and configuration data about the selected component is sometimes referred to as "drilling down". The navigation module 702 contains navigation components which, when selected, cause the user to navigate to another screen or to display other configuration data for that component.

The screen module 706 comprises a screen frame and screen components 708. The screen frame is a visual text area located in the browser window in which the screen components 708 are displayed. The screen components 708 comprise HTML pages identifying configuration data for components and subcomponents of the cell site complexes 106 and 108, such as configuration data for the digital trunk interface 214 or the switching unit 216 of FIG. 2.

The parameter and component configuration module 710 allows a user to enter configuration data for a parameter or for a component of the cell site complex 106 or 108. The parameter and equipment configuration module 710 receives the configuration data entered by a user, processes the configuration data, and transmits signaling to the cell site complexes 106 and 108 for effecting configuration of the respective parameter or component.

The data loading module 712 loads configuration data that is contained within the database to a standard spread sheet application or word processing application. The data loading module 712 comprises a data link download to view the data links for a switch, a T1 circuit download to view trunk group information, and a packet pipe download to view information about packet pipe assignments at the base transceiver 210 and the switching unit 216.

The links module 714 displays a set of hypertext links on the screen frame of each screen. The hypertext links comprise links to other screen components and configuration reports. The links also function to describe screen components that have been selected for display.

The report interface module 716 generates a configuration error report and a data load error report. The configuration error report details errors found from analyzing the cell site complex 106 or 108 for configuration errors. A report may be submitted for a switch, a cell site, or any of the components or component parameters for the switch or cell site. The data load error report will generate a report of errors that occurred when loading configuration data to the database 404.

Figure 8:
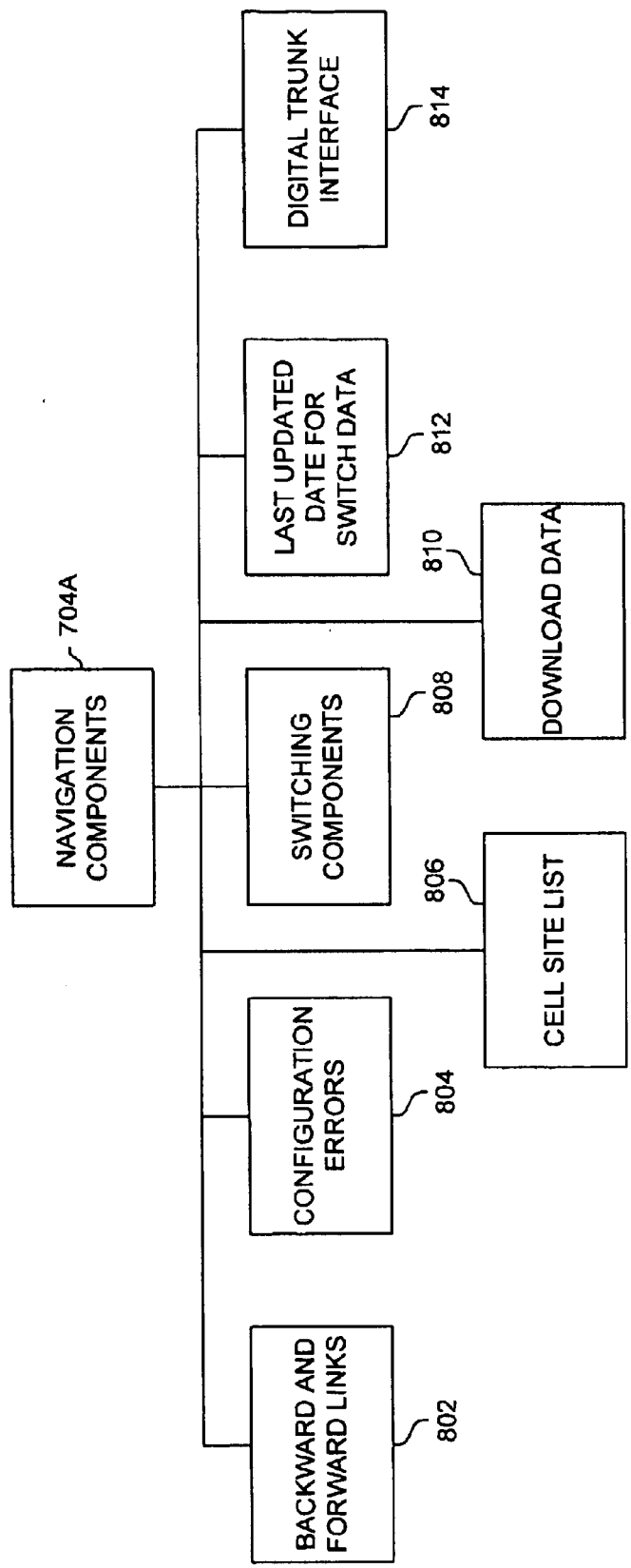
FIG. 8 is a block diagram of navigation components in accordance with an embodiment of the present invention.

FIG. 8 illustrates an exemplary embodiment of the navigation components 704A that may be used in conjunction with the cell site complex 108 of FIG. 2. The navigation components 704A of FIG. 8 comprise a backward and forward links 802, a configuration errors 804, a cell site list 806, switching components 808, download data 810, a last updated data for switch data 812, a digital trunk interface (DTI) assignment 814. It will be appreciated that greater, fewer, or other components may be used.

The backward and forward links 802 allows navigation backward and forward between the list of components, such as screens. If a backward component is not specified, the backward link will not be selectable. Likewise, if the forward component is not specified, the forward link will not be selectable.

The configuration errors 804 display the number of errors for a component of the cell site complex 106 or 108. The configuration errors 804 navigation component includes an error count for the number of errors associated with that component and a link to a configuration error report for that component. A user may select the link, and the configuration error report will be displayed.

The cell site list 806 contains a list of cell sites for which processing and connections are controlled by the selected switch 204. The cell site list 810 includes a link to the cell site screen (see FIG. 9).

The switching components 808 displays links to each switching component and its corresponding DTI associated with the selected switch 204. The switching components 808 are displayed only for the selected switch screen (see FIG. 9).

The download data 810 displays links to functions which enable the download of data into other formats, such as spreadsheets. The download data 810 is displayed in conjunction with the selected switch screen (see FIG. 9).

The last updated date for switch data 812 is an optional navigation component. The last updated data for switch data displays the date from which the current data from the current switch was loaded into the cell configuration system 302.

The DTI assignment 814 displays the assignment for DS1s between the base transceiver 210 and 108 and the switch 204. The DTI assignment 814 links to the DTI screen (see FIG. 9).

Figure 9:
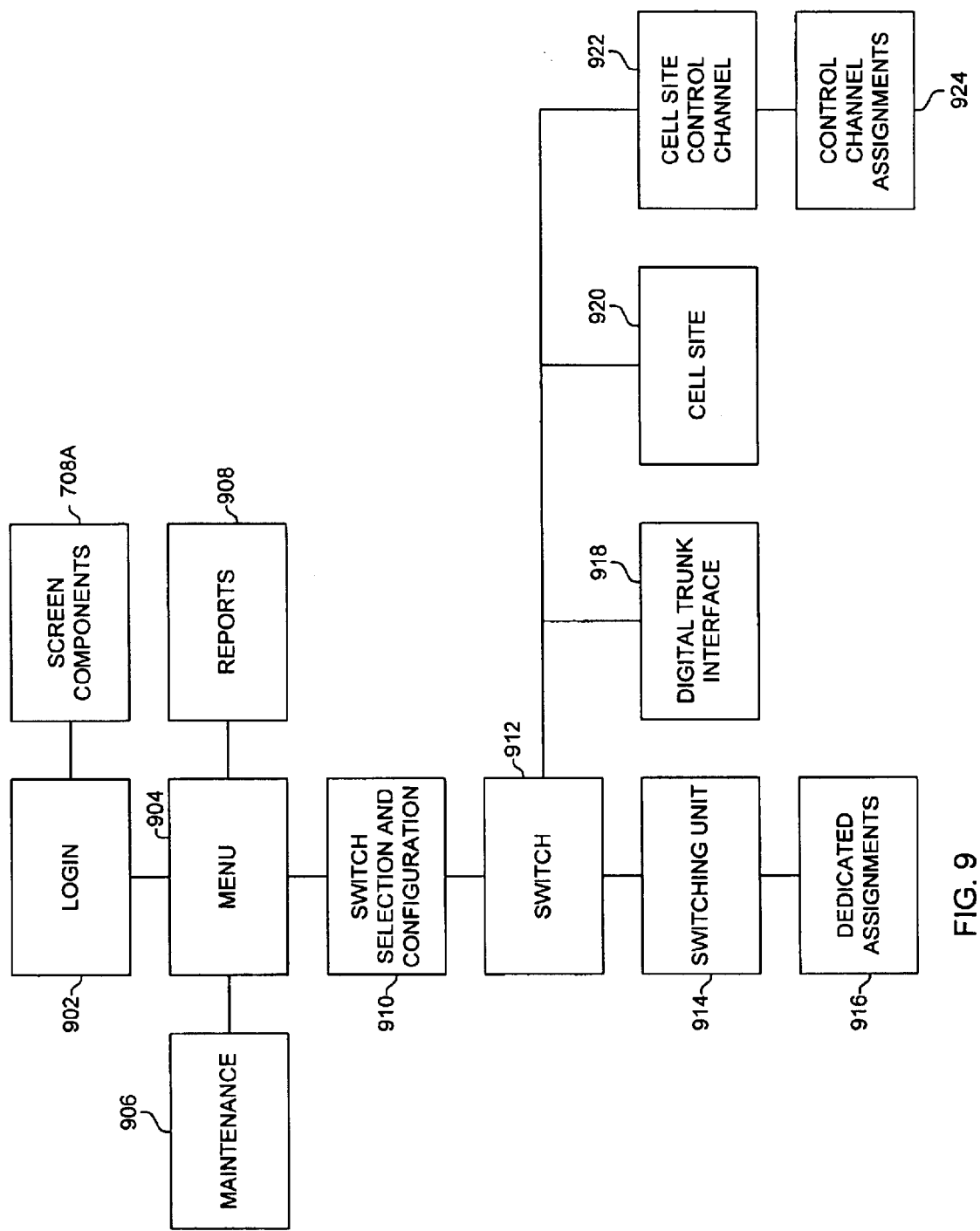
FIG. 9 is a block diagram of screen components in accordance with an embodiment of the present invention.

FIG. 9 depicts an exemplary embodiment of screen components 708A displayed for the configuration of the cell site complex 108 of FIG. 2. The screen component 708A comprises a login 902, a menu 904, maintenance 906, reports 908, switch selection and configuration 910, a switch 912, a switching unit 914, dedicated assignments 916, a DTI 918, a cell site 920, a cell site control channel 922, and control channel assignments 924. It will be appreciated that greater, fewer, or other components may be used.

The login 902 requires a session to be initiated by entering a login and a password. The login and password then are submitted in HTML form to the cell configuration system 302. The cell configuration system 302 determines if a match is found for the login and password. If a match is not found or if the specified login and password are not active, then the application will cause a login failure. If the login and password combination is matched and active, the cell configuration system 302 will cause the user to navigate to the menu 904.

The menu 904 uses a tree-like structure to provide easy navigation to menu options. The menu 904 provides high level access to reports, maintenance, and switch selection and configuration.

Maintenance 906 allows an administrator to configure security access for particular users or for particular groups of users to switch information. The security access level may be set for each screen that potentially may be displayed to any user or group of users. Maintenance 906 also provides access to edit and configure menu information and screens that will be displayed. Maintenance 906 further provides editing and configuration of security features for login and user access.

Reports 908 provides access to any report that is generated from the cell configuration system 302. This includes configure error reports and reports specifying certain component configurations, such as data link reports, DS1 to DTI assignments, and DS0 assignments.

The switch selection and configuration 910 displays all switches for which configuration data may be displayed or for which parameters or components may be configured. Preferably, the switches are grouped by market and ordered by the switch name. The switch selection and configuration 910 contains a link for a switch screen associated with each displayed switch.

The switch 912 displays a summary of the switch statistics including the switching unit shelf statistics and DTI facility statistics for each switching unit. The switch 912 also contains a summary of CSN port capacity and usage and the data link pair capacity and usage for the selected switch. In addition, the switch 912 provides the following information to the navigation module: the number of configuration errors for the switch, a list of cell site control channel assignments for the switch, a list of switching units for the switch, a list of cell sites assigned to the switch, and links to the configuration error report, the cell site control channel assignments screen, the switching unit screen, and the cell site screen.

The switching unit 914 displays the configuration for a selected switching unit for a switch, including its location, capacity, and usage. The switching unit 914 provides for navigation to the dedicated assignments 916. The switching unit 914 will provide the following information to the navigation module: the number of configuration errors for the switching unit, a list of cell sites that are assigned to a dedicated assignments interface or a DTI facilities interface on the selected switching unit, and links to the configuration error report for the selected switching unit and the cell site screen.

The dedicated assignments 916 displays the configuration for a selected dedicated assignments interface card. The dedicated assignments 916 includes a display of the interface assignments and usage. The dedicated assignments 916 provides the following information to the navigation module: the number of configuration errors for the switching unit associated with the dedicated assignments interface, a list of cell sites that are assigned to the dedicated assignments interface, a link to the configuration error report for the selected switching unit, and a link to the cell site screen for each cell site.

The DTI 918 displays the configuration for a switching unit's DTI. The configuration data includes DTI assignments for any network element terminating at the selected switch, including the PSTN, prepaid platforms, directory assistance platforms, operator services platforms, and other service platforms. The DTI 918 provides the following information to the navigation module: the number of configuration errors for the switching unit associated with the DTI, a list of cell sites that have DS1 circuits terminating on the DTI of the selected switching unit, a link to the configuration error report for the selected switching unit, and a link to the cell site screen for each cell site.

The cell site 920 displays a configuration for the cell site, including the BTs. The cell site 920 also displays assignments to switch components for data links, DS0 packets, and DS1 circuits. The cell site 920 provides the following information to the navigation module: the number of configuration errors from the cell site, a list of DS1 circuits originating from the cell site, a list of BT components, a link to the configuration error report for the cell site, a link to the cell site control channel node screen for the corresponding control channel, a link to the DTI screen associated with the cell site and originating DS1, and a link to the dedicated assignments screen.

The cell site control channel 922 displays the configuration for a pair of cell site control channels. The cell site control channel 922 displays a summary of the control channel usage and a list of the control channel assignments with a usage summary for each cell site control channel. The cell site control channel 922 provides the following information to the navigation module: the number of configuration errors for each control channel assignment displayed on the cell site control channel, a list of cell sites whose data links are connected to a cell site control channel assignment displayed on the cell site control channel, a link to the configuration error report for the cell site control channel assignments, and a link to the cell site screen.

The control channel assignments 924 displays the configuration for a pair of control channel assignments. A summary of usage for each control channel assignment is displayed. The control channel assignments 924 provides the following information to the navigation module: the number of configuration errors for each control channel assignment, a list of cell sites whose data links are connected to either control channel, a link to the configuration error report for the control channel, and a link to the cell site screen.

Figure 10:
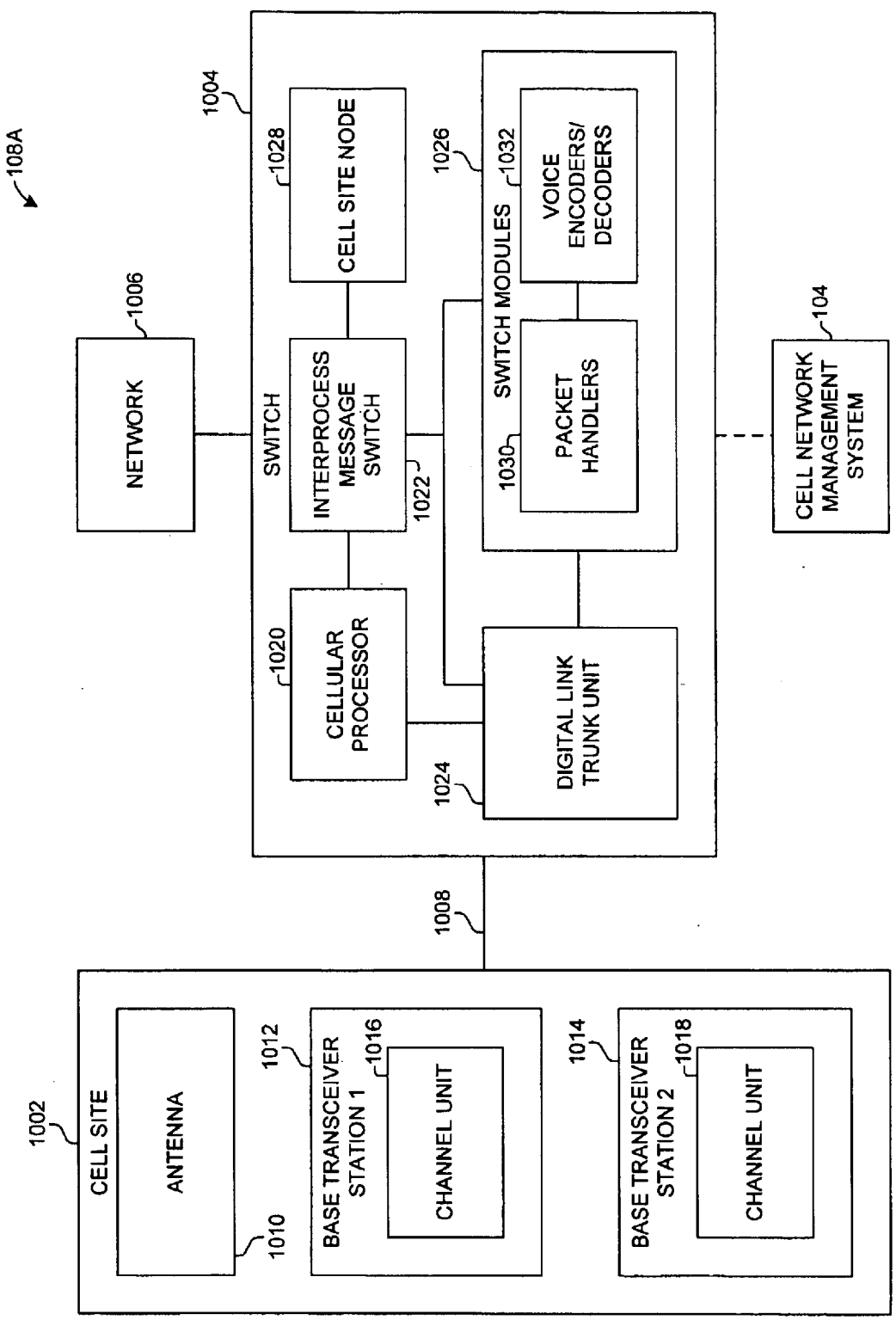
FIG. 10 is a block diagram of another cell site complex in accordance with an embodiment of the present invention.

FIG. 10 illustrates another exemplary embodiment of the cell network management system 104 linked to a cell site complex 108A. The cell site complex 108A comprises a cell site 1002, a switch 1004, and a network 1006.

The cell site 1002 transmits and receives wireless communications and signaling. The cell site 1002 also transmits and receives communications and signaling to and from the switch 1004 over a connection 1008. The connection 1008 can be any wireline connection, such as a T1 or another transmissions medium.

The cell site 1002 comprises an antenna 1010, a first base transceiver station (BTS) 1012, and a second BTS 1014. The BTSs 1012 and 1014 each comprise a channel unit 1016 and 1018.

The antenna 1010 transmits and receives the wireless communications and signaling, if any. Typically, antenna 1010 may have three sectors from which the communications are transmitted or at which they are received. Therefore, the antenna may transmit and receive in three sectors.

The BTSs 1012 and 1014 process any signaling and determine which communications and signaling are transmitted to and from the cell site as either wireless communications or wireline communications over the connection 1008 to the switch 1004. For example, if the connection 1008 is a T1 connection having twenty-four channels, a BTS will transmit voice communications over twenty-two of the twenty-four channels and will transmit signaling over two of the channels referred to as data links. The data links are designated as data link 0 (DL0) and data link 1 (DL1). Each BTS typically will have its own T1 connection to the switch 1004. Therefore, in the example in which the cell site 1002 has two BTSs 1012 and 1014, the connection 1008 comprises two T1 connections originating from the cell site 1002 and terminating at the switch 1004.

In addition, the BTSs 1012 and 1014 control the conversion of the wireless communications into wireline communications that can be transmitted over the connection 1008. Likewise, any communications that are received from the switch 1004 over the connection 1008 are converted from the digital transmission to wireless communications, and that conversion is controlled by the BTSs 1012 and 1014.

The channel units 1016 and 1018 provide termination points in the BTSs 1012 and 1014 for the connection 1008. Typically, a subset of DS0s in the T1, referred to herein as packet pipes, will terminate at a channel unit 1016 or 1018 in the BTSs 1012 or 1014. For example, a subset of eight DS0s from the T1, referred to alternately as an 8 PP or an 8 DS0, will terminate at the channel unit 1016 or 1018.

The switch 1004 of FIG. 10 controls the call processing for the cell site complex 108A. The switch 1004 processes signaling and switches communications between the cell site 1002 and the network 1006. The switch 1004 of FIG. 10 comprises a cellular processor 1020, a interprocess message switch (IMS) 1022, a digital link trunk unit (DLTU) 1024, switch modules 1026, and cell site nodes (CSN) 1028. The switch modules 1026 comprise packet handlers 1030 and voice encoders/decoders 1032.

The cellular processor 1020 receives, processes, and transmits signaling. The cellular processor 1020 selects connections for communications, thereby determining how a call will be switched between the cell site 1002 and the network 1006.

The IMS 1022 connects the components of the switch 1004. The MS 1022 provides a switch interconnect between the cellular processor 1020, the DLTU 1024, the switch modules 1026, the CSN 1028, and other external connections so that signaling is transmitted between the components of the switch 1004.

The DLTU 1024 terminates the connection 1008 at the switch 1004. The DLTU 1024 is the point at which trunk groups from the T1 tie into the switch 1004 prior to being split into groups of packet pipes. An associated DLTU equipment number (DEN) identifies the shelf, slot, and facility assignment for the DLT termination point.

The switch modules 1026 provide originating and terminating points for digital and analog connections to and from the switch 1004. The switch modules 1026 are switching units that convert communications between digital and analog and make connections for communications being transferred between the cell site 1002 and the network 1006. A unit equipment number (UEN) identifies the termination point in the switch modules by shelf, slot, and port for packet pipes split from the DLTU. Typically, the UEN assignments terminate at the same switch module, and the packet pipes are pre-assigned to terminate at those switch modules.

The CSN 1028 identifies dedicated control channels for the switch 1004. The CSN 1028 identifies the termination point of all data links coming from the cell site 1002. The data links and the termination point in the CSN are pre-assigned. Typically, CSN pairs terminate in respective IMS cabinets. For example, a CSN node pair 1 may terminate in cabinet 0 and cabinet 32.

The packet handlers (PH) 1030 are components that terminate packet pipes in the switch 1004. For example, a PH4 card provides termination for an eight DS0 packet pipe. A PH4 card has twenty-four channels for dedicated packet pipe termination. The packet handlers provide the termination point in the switch for the communications prior to being switched from the switch 1004 to the network 1006 or from the network to the cell site 1002.

The voice encoders/decoders 1032 are a pooled resource that convert communications between digital and analog. The voice encoders/decoders 1032 provide the entry and exit points between the switch 1004 and the network 1006. The voice encoders/decoders 1032 can be, for example, a V2 or a V4. A V2 can handle twelve time slots, while a V4 can handle thirty-two time slots.

The network 1006 comprises a wireline communications network, a wireless communications network, and any components in a communications network, such as a cell site, a switch, a gateway, or a network element.

Figure 11:
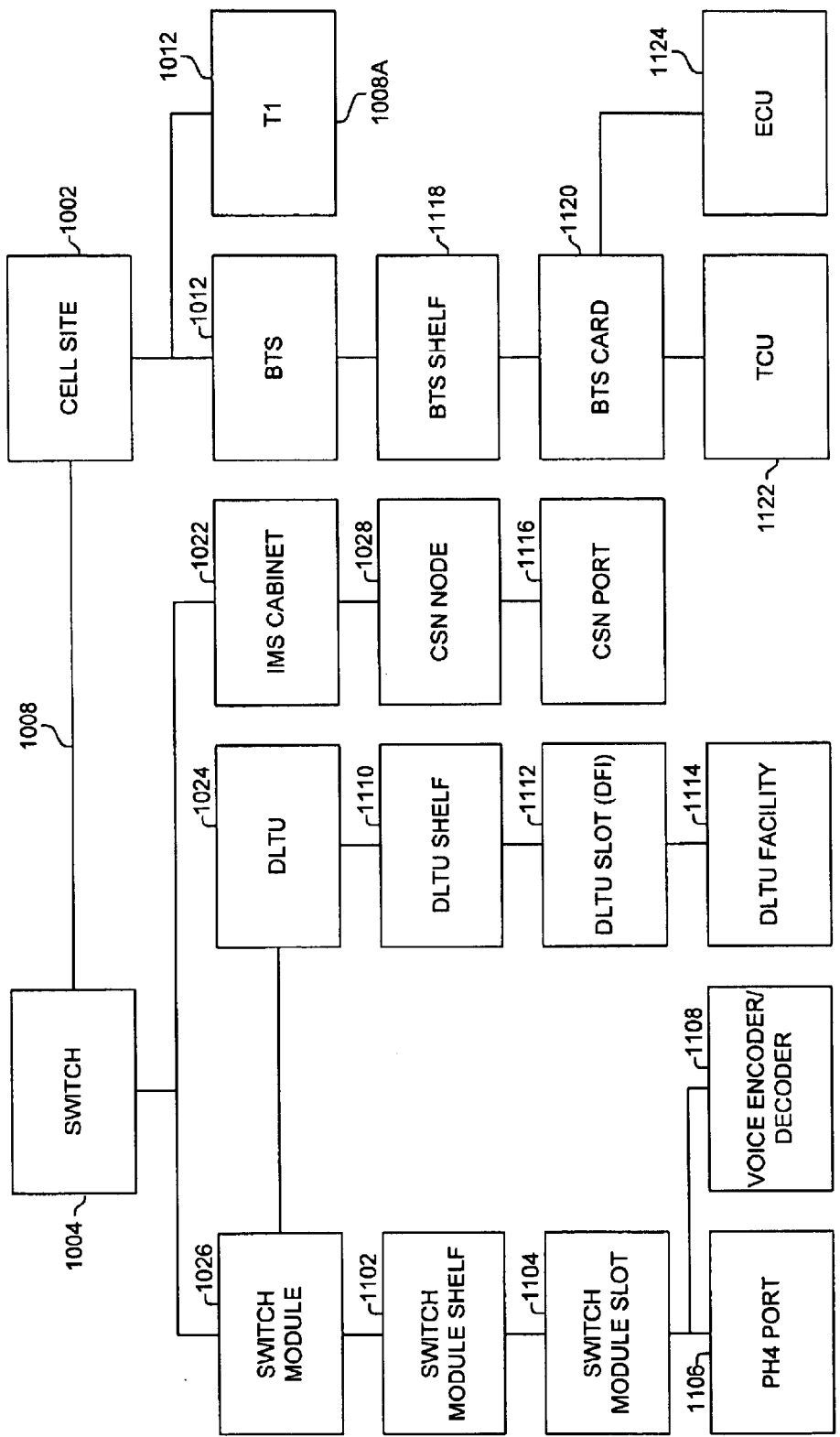
FIG. 11 is a block diagram of components of the cell site complex of FIG. 9 in accordance with an embodiment of the present invention.

FIG. 11 further illustrates the structure of the switch complex 108A of FIG. 10. The switch module 1026 has switch module shelves 1102 that each contains switch module slots 1104. The switch module slots 1104 may contain either a PH4 port 1106 or a voice encoder/decoder port 1108, such as a V2 or V4. Each switch module 1026 has an associated DLTU 1024. The DLTU has an associated DLTU shelf 1110 with DLTU slots 1112 and a DLTU facility 1114. Also, the IMS 1022 has an associated CSN node 1028 with a CSN port 1116.

The cell site 1002 has its BTS 1012 with an associated BTS shelf 1118 and BTS card 1120. Each BTS card can handle a TCU 1122 or an ECU 1124. The connection 1008 for this embodiment is a T1 1008A.

Figure 12:
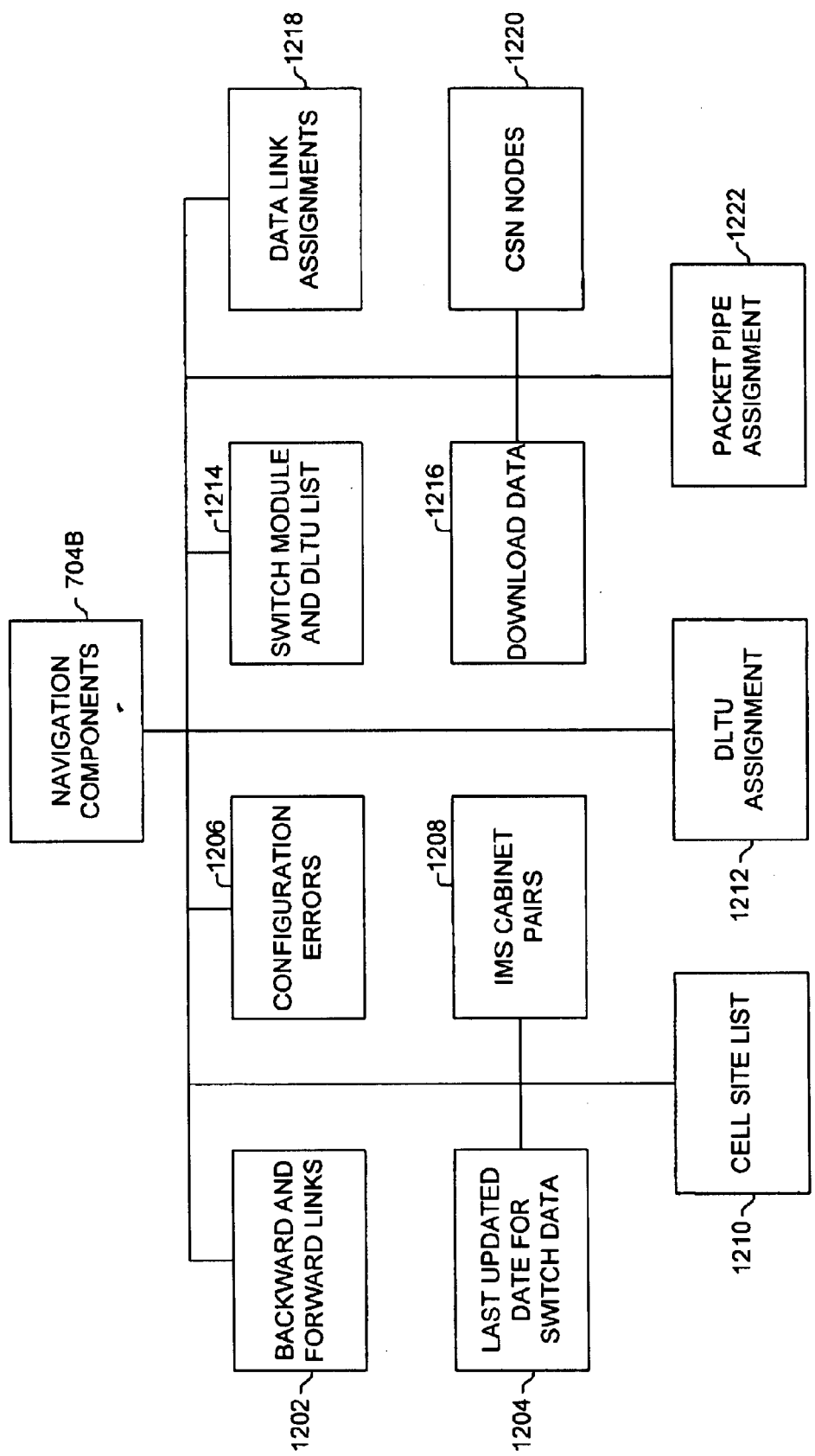
FIG. 12 is a block diagram of other navigation components in accordance with an embodiment of the present invention.

FIG. 12 illustrates an exemplary embodiment of navigation components 704B that may be used in conjunction with the cell site complex 108A of FIG. 10. The navigation components 704B of FIG. 12 comprise backward and forward links 1202, a last updated date for switch data 1024, configuration errors 1206, IMS cabinet pairs 1208, cell site lists 1210, a DLTU assignment 1212, a switch module and DLTU list 1214, download data 1216, data link assignments 1218, CSN nodes 1220, and packet pipe assignments 1222. It will be appreciated that greater, fewer, or other components may be used.

The backward and forward links 1202 allow navigation backward and forward between a list of components, such as screens. If a backward component is not specified, the backward link will not be selectable. Likewise, if the forward component is not specified, the forward link will not be selectable.

The last updated date for switch data 1204 is an optional navigation component. The last updated date for switch data displays the date from which the current data from the current selected switch was loaded into the cell configuration system 302.

The configuration errors 1206 display the number of errors for a component of the cell site complex 106 or 108. The configuration errors 1206 navigation components include an error count for the number of errors associated with that component and a link to a configuration error report for that component. A user may select the link, and the configuration error report will be displayed.

The IMS cabinet pairs 1208 displays a list of IMS cabinet pairs configured for the switch 1004. The IMS cabinet pairs 1206 includes a link to the IMS cabinet pair screen (see FIG. 13).

The cell site list 1210 contains a list of cell sites for which processing and connections are controlled by the switch 1004. The cell site list 1210 includes a link to the cell site screen (see FIG. 13).

The DLTU assignment 1212 displays the assignment for T1s between the BTSs 1010 and 1012 and the switch 1004. The DLTU assignment 1212 links to the DLTU screen (see FIG. 13).

The switch module and DLTU list 1214 displays links to each switch module and its corresponding DLTU associated with the selected switch 1004. The switch module and DLTU list 1214 are displayed only for the selected switch screen (see FIG. 13).

The download data displays links to functions which enable the download of data into other formats, such as spreadsheets. The download data 1216 is displayed in conjunction with the selected switch screen (see FIG. 13).

The data link assignment 1218 displays the DLTU assignment for each T1 termination from a BTS 1010 or 1012 to the switch 1004. The data link assignments 1218 contains a link to the CSN ports screen for the current cell site.

The CSN nodes 1220 display the CSN nodes associated with each IMS. The CSN nodes 1220 are displayed on the IMS cabinet pair screen and contains links to the CSN node screen (see FIG. 13).

The packet pipe assignments 1222 display the BTS shelves associated with each BTS 1010 and 1012. The packet pipe assignments 1222 are displayed on the switch screen and link to the corresponding PH4 screen for each packet pipe component associated with a PH4 in a switch module.

Figure 13:
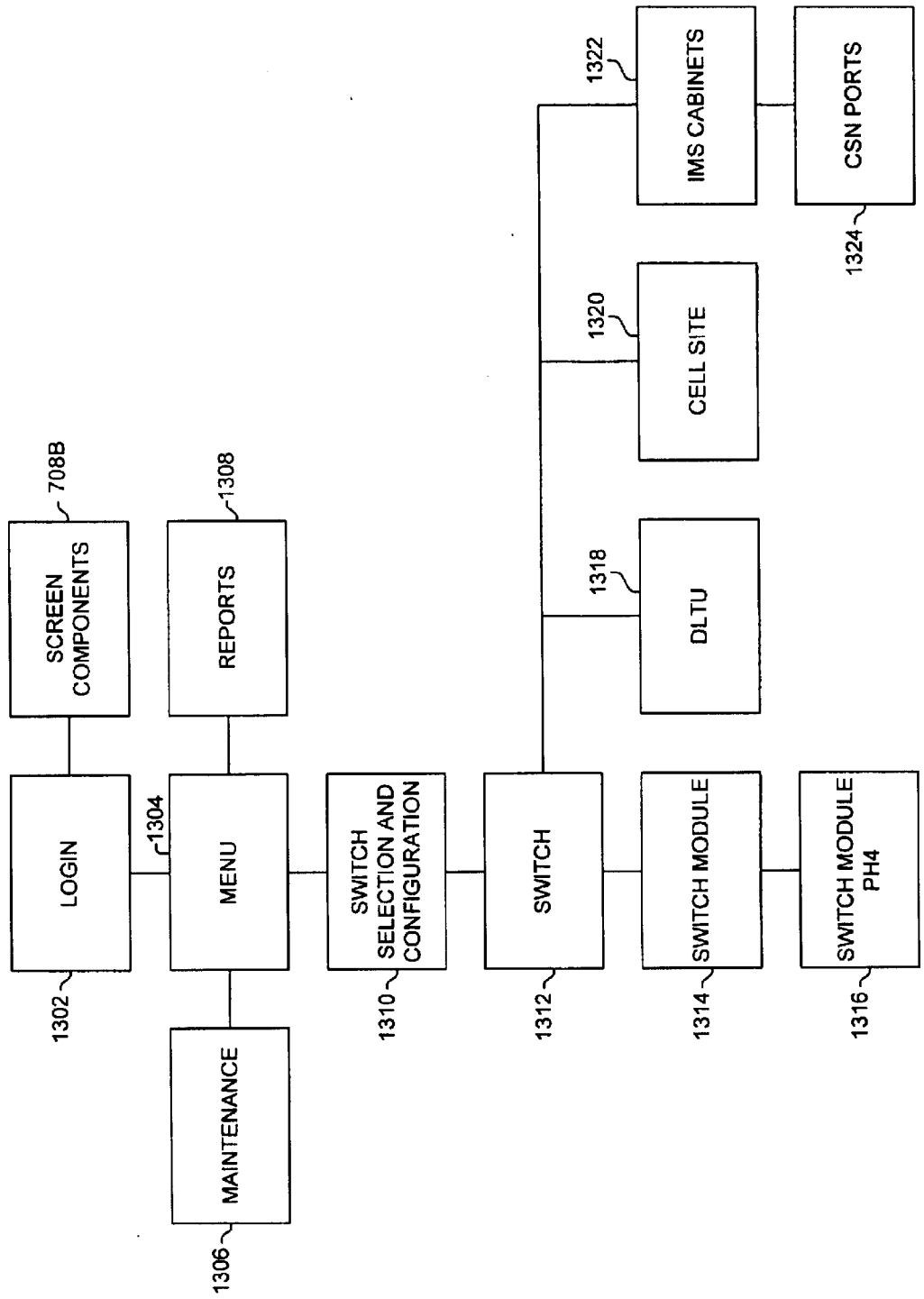
FIG. 13 is a block diagram of other screen components in accordance with an embodiment of the present invention.

FIG. 13 depicts an exemplary embodiment of screen components 708B displayed for the configuration of the cell site complex 108A of FIG. 10. The screen components 708B comprise a login 1302, a menu 1304, maintenance 1306, reports 1308, switch selection and configuration 1310, a switch 1312, a switch module 1314, a switch module PH4 1316, a DLTU 1318, a cell site 1320, an IMS 1322, and CSN ports 1324. It will be appreciated that greater, fewer, or other components may be used.

The login 1302 requires a session to be initiated by entering a login and a password. The login and password then are submitted in HTML form to the cell configuration system 302. The cell configuration system 302 determines if a match is found for the login and password. If a match is not found or if the specified login and password are not active, then the application will cause a login failure. If the login and password combination is matched and active, the cell configuration system 302 will cause the user to navigate to the menu 1304.

The menu 1304 uses a tree-like structure to provide easy navigation to menu options. The menu 1304 provides a high level access to reports, maintenance, and switch selection and configuration screens.

Maintenance 1306 allows an administrator to configure security access for particular users or for particular groups of users to switch information. The security access level may be set for each screen that potentially may be displayed to any user or group of users. Maintenance 1306 also provides access to edit and configure menu information and screens that will be displayed. Maintenance 1306 further provides editing and configuration of security features for login and user access.

Reports 1308 provides access to any report that is generated from the cell configuration system 302. This includes configuration error reports and reports specifying certain component configurations.

The switch selection and configuration 1310 displays all switches for which configuration data may be displayed or for which parameters or components may be configured. Preferably, the switches are grouped by market and ordered by the switch name. The switch selection and configuration 1310 contains a link for a switch screen associated with each switch displayed.

The switch 1312 displays a summary of the switch statistics, including the switch module shelf statistics and DLTU facility statistics for each switch module. The switch 1312 also contains a summary of CSN port capacity and usage and the data link pair capacity and usage for the selected switch. In addition, the switch 1312 provides the following information to the navigation module: the number of configuration errors for the switch, a list of IMS cabinet pairs for the switch, a list of switch modules for the switch, a list of cell sites assigned to the switch, and links to the configuration error report, the IMS cabinet pair screen, the switch module screen, and the cell site screen.

The switch module 1314 displays the configuration for a selected switch module for a switch, including card location and capacity, a summary of capacity and usage for each shelf, and a summary of shelf statistics for the switch module. The switch module 1314 provides for navigation to the switch module PH4 1316. The switch module 1314 provides the following information to the navigation module: the number of configuration errors for the switch module, a list of cell sites that are assigned to a PH4 card or a DLTU facilities interface (DFI) card on the selected switch module, and links to the configuration error report for the selected switch module and the cell site screen.

The switch module PH4 1316 displays the configuration for a selected PH4 card. The switch module PH4 1316 includes a display of the ports of the PH4 assignments and a summary of the card usage. The switch module PH4 1316 provides the following information to the navigation module: the number of configuration errors for the switch module slot associated with the PH4 card, a list of cell sites that are assigned to the PH4 card, a link to the configuration error report for the selected switch module, and a link to the cell site screen for each cell site.

The DLTU 1318 displays the configuration for a switch module's DLTU. The configuration data includes DLTU assignments for any network element terminating at the selected switch, including the PSTN, prepaid platforms, directory assistance platforms, operator service platforms, and other service platforms. The DLTU 1318 provides the following information to the navigation module: the number of configuration errors for the switch module associated with the DLTU, a list of cell sites that have T1 circuits terminating on the DLTU of the selected switch module, a link to the configuration error report for the selected switch module, and a link to the cell site screen for each cell site.

The cell site 1320 displays a configuration for the cell site, including the BTSs. The cell site 1320 also displays assignments to switch components for data links, packet pipes, and T1 circuits. The cell site 1320 provides the following information to the navigation module: the number of configuration errors from the cell site, a list of T1 circuits originating from the cell site, a list of BTS components, a link to the configuration error report for the cell site, a link to the CSN node screen for the corresponding CSN node pair, a link to the DLTU screen associated with the cell site and originating T1, and a link to the PH4 screen.

The IMS 1322 displays the configuration for a pair of IMS cabinets. The IMS 1322 displays a summary of the CSN port usage for each cabinet and a list of the CSN nodes with a usage summary for each IMS cabinet. The IMS 1322 provides the following information to the navigation module: the number of configuration errors for each cabinet displayed on the IMS, a list of cell sites whose data links are connected to an IMS cabinet displayed on the IMS, a link to the configuration error report for the IMS cabinet pair, and a link to the cell site screen.

The CSN ports 1324 displays the configuration for a pair of CSN nodes. A summary of port usage for each CSN node is displayed. The CSN ports 1324 provides the following information to the navigation module: the number of configuration errors for each CSN node, a list of cell sites whose data links are connected to either CSN node pair, a link to the configuration error report for the CSN node pair, and a link to the cell site screen.

Figure 14:
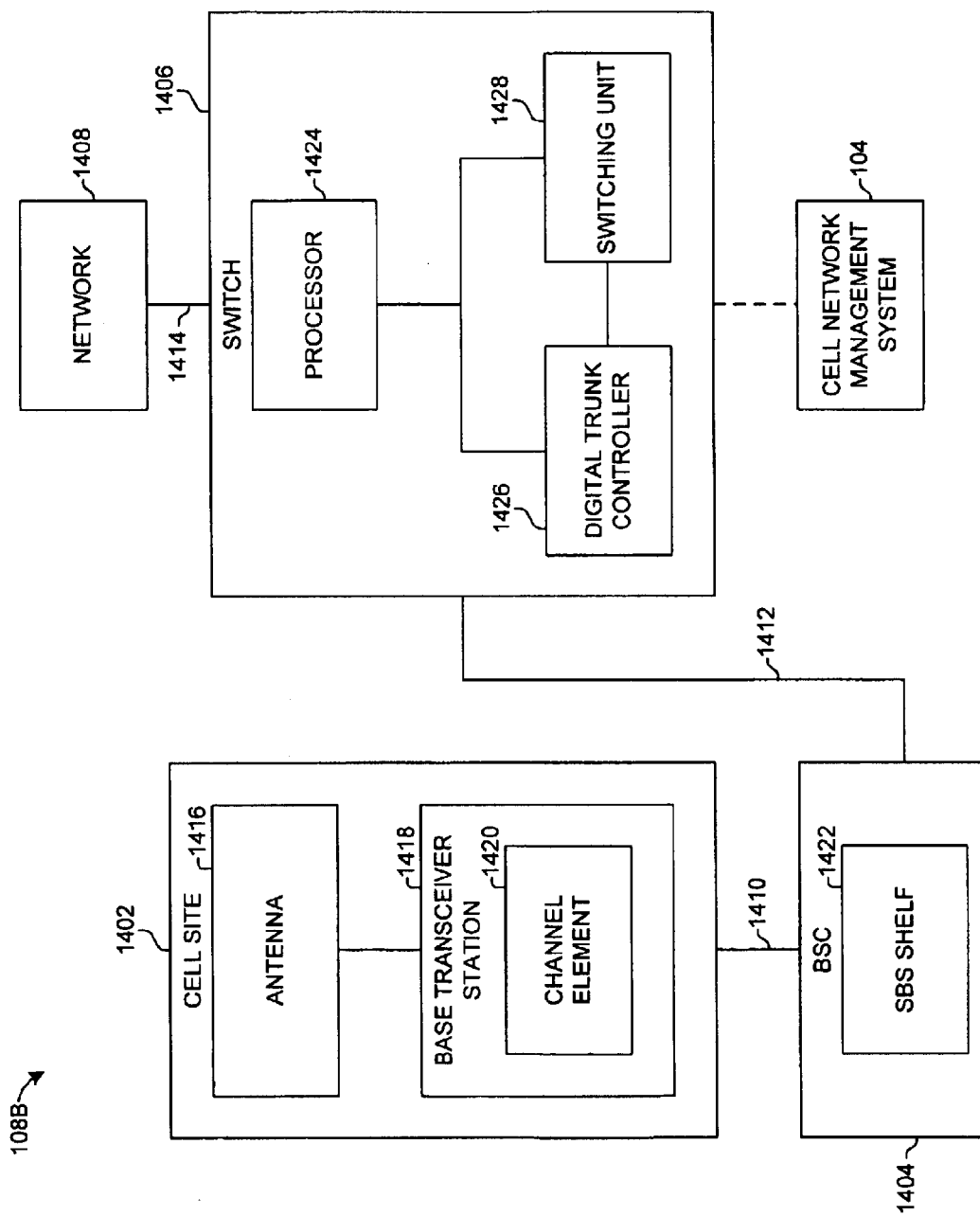
FIG. 14 is a block diagram of another cell site complex in accordance with an embodiment of the present invention.

FIG. 14 illustrates another exemplary embodiment of the cell network management system 104 linked to a cell site complex 108B. The cell site complex 108B comprises a cell site 1402, a base station controller (BSC) 1404, a switch 1406, and a network 1408. The BSC 1404 is connected to the cell cite by a connection 1410 and to the switch 1406 by a connection 1412. The switch 1406 is connected to the network by a connection 1414.

The cell site 1402 transmits and receives wireless communications and signaling. The cell site 1402 also transmits and receives communications and signaling to and from the BSC 1404 over the connection 1410. The connection 1410 can be any wireline connection, such as a T1 or another transmissions medium. The cell site 1402 comprises an antenna 1410 and a base transceiver station (BTS) 1418 having a channel element 1420.

The antenna 1416 transmits and receives the wireless communications and signaling, if any. Typically, antenna 1416 may have three sectors from which the communications are transmitted or at which they are received. Therefore, the antenna 1416 may transmit and receive in three sectors.

The BTS 1418 processes any signaling and determines which communications and signaling are transmitted to and from the cell site 1402 as either wireless communications or wireline communications over the connection 1410 to the BSC 1404. In addition, the BTS 1418 controls the conversion between wireless communications and wireline communications that can be transmitted over the connection 1410.

The channel element 1429 provides termination points in the BTS for the connection 1410. Typically, a subset of DS0s in the T1 will terminate at a channel element 1420 in the BTS 1418.

The SBC 1404 controls switching for the communications between the cell site 1402 and the switch 1406. The SBS 1404 has a selector bank subsystem (SBS) shelf 1422 that originates and terminates channels for communications between the cell site 1402 and the switch 1406, assigns channels for a call, and terminates the channels after the call. The SBS shelf 1422 is a pooled resource.

The switch 1406 of FIG. 14 controls the call processing for the cell site complex 108B. The switch 1406 processes signaling and switches communications between the cell site 1402 and the network 1408. The switch 1406 of FIG. 14 comprises a processor 1424, a digital trunk controller (DTC) 1426, and a switching unit 1428.

The processor 1424 receives, processes, and transmits signaling. The processor selects connections for communications, thereby determining how a call will be switched between the cell site 1402 and the network 1408.

The DTC 1426 terminates the connection 1412 at the switch 1406. The DTC 1426 is the point at which trunk groups from the T1 tie into the switch 1406 prior to being split into groups of packet pipes.

The switching unit 1428 provides originating and terminating points for digital and analog connections to and from the switch 1406. The switching unit 1428 converts communications between digital and analog and makes connections for communications being transferred between the cell site 1402 and the network 1408.

USER INTERFACE EMBODIMENT

FIGS. 15–24 illustrate exemplary embodiments of screen components. A browser is used to navigate through the screen components and through configuration data. The browser based system allows multiple users access to the cell configuration system 302 via an internet or intranet by using the HTML pages with IP protocol. This allows a user to quickly and easily navigate through the screen components, view displayed configuration information, and enter configuration information. Although the Microsoft Internet Explorer brand browser is illustrated in the exemplary figures, any browser may be used. Other browsers may include the Netscape Navigator brand browser and others.

The screens provide navigation components and navigation tools. For example, screens may include a navigation frame on a portion of the screen. The navigation frame may include one or more navigation components, such as those described above. In addition, navigation tools may be provided in the screen frame. In one example, hypertext links are provided to other screens or another portion of the screen frame. Also, hypertext links may be provided in the configuration data portion so that a user may select a link of a parameter or component to "drill down" to a parameter or component, i.e. to navigate to another screen that displays additional information for that parameter or component.

Figure 15:
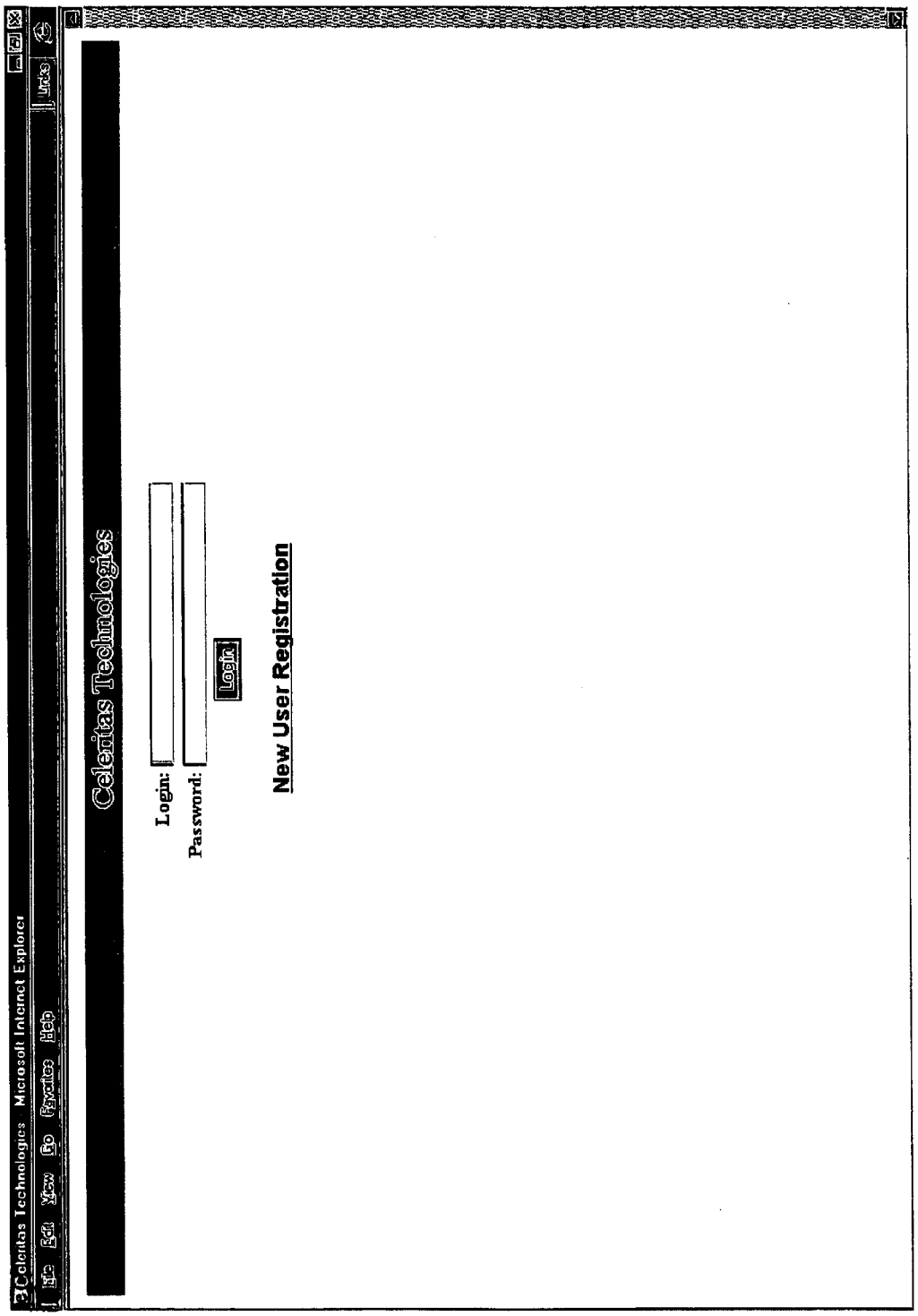
FIG. 15 is a screen view of a login screen in accordance with an embodiment of the present invention.

FIG. 15 depicts an example of a login screen. The login screen allows the user to initiate a session by entering a login name and a password. The login and password then are submitted in HTML form to the configuration management system 302. The configuration management system 302 determines if a login and password combination matches the information provided in the security database to determine if the user has access to the system. If a combination is not found or if the information specified is inactive, then a login frame failure is displayed. If the login and password combination are active and match a security profile for user access, the user is provided access to the system. The login screen also provides a user the ability to fill out a form to request access to the screen. The new user may request to be part of a certain group or to have access to certain markets.

Figure 16:
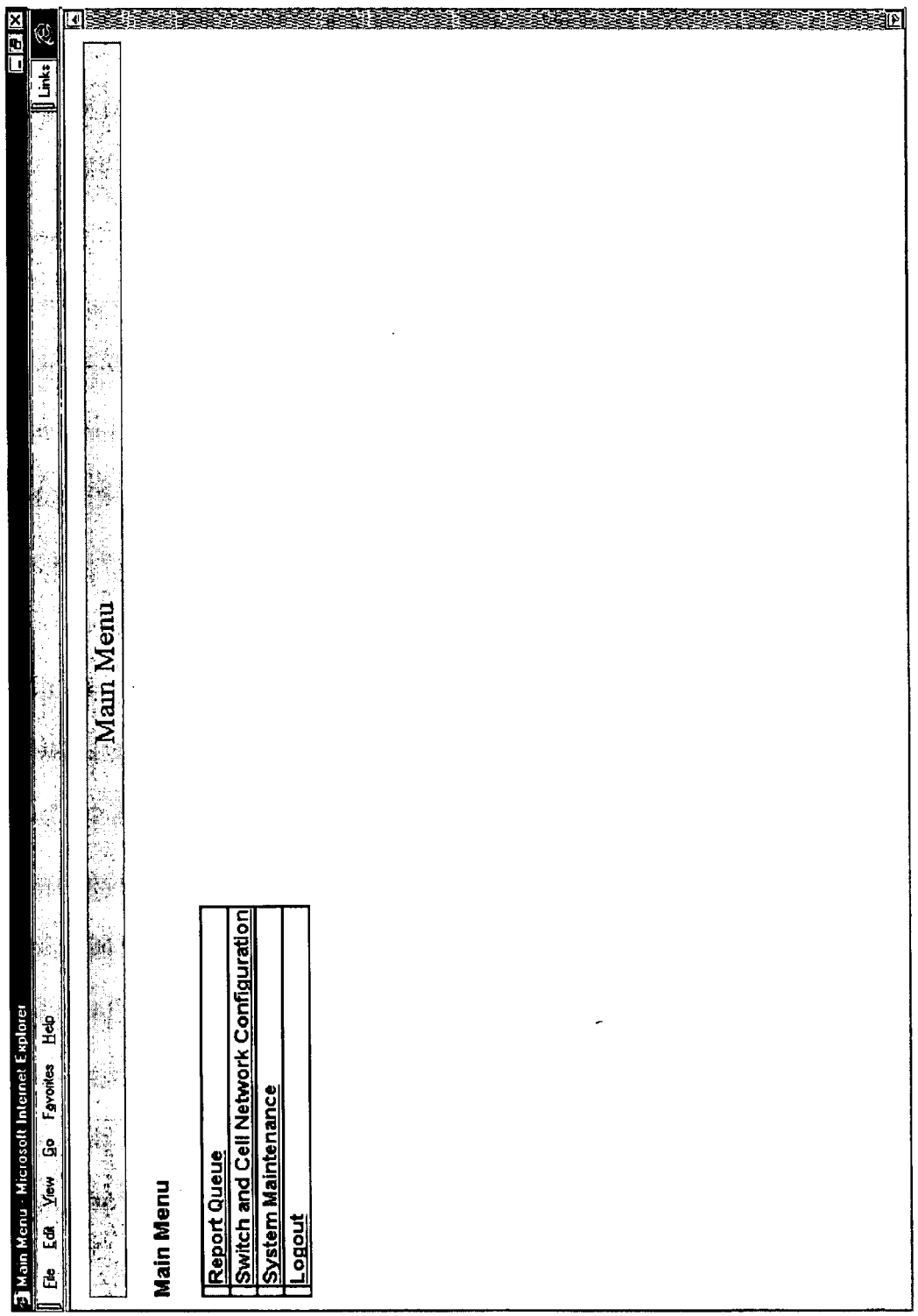
FIG. 16 is a screen view of a menu screen in accordance with an embodiment of the present invention.

FIG. 16 depicts an example of a menu screen. The menu screen provides a tree structure for access to reports, system maintenance, and switch and cell site selection and configuration. In addition, a user may logout from this screen.

Figure 17:
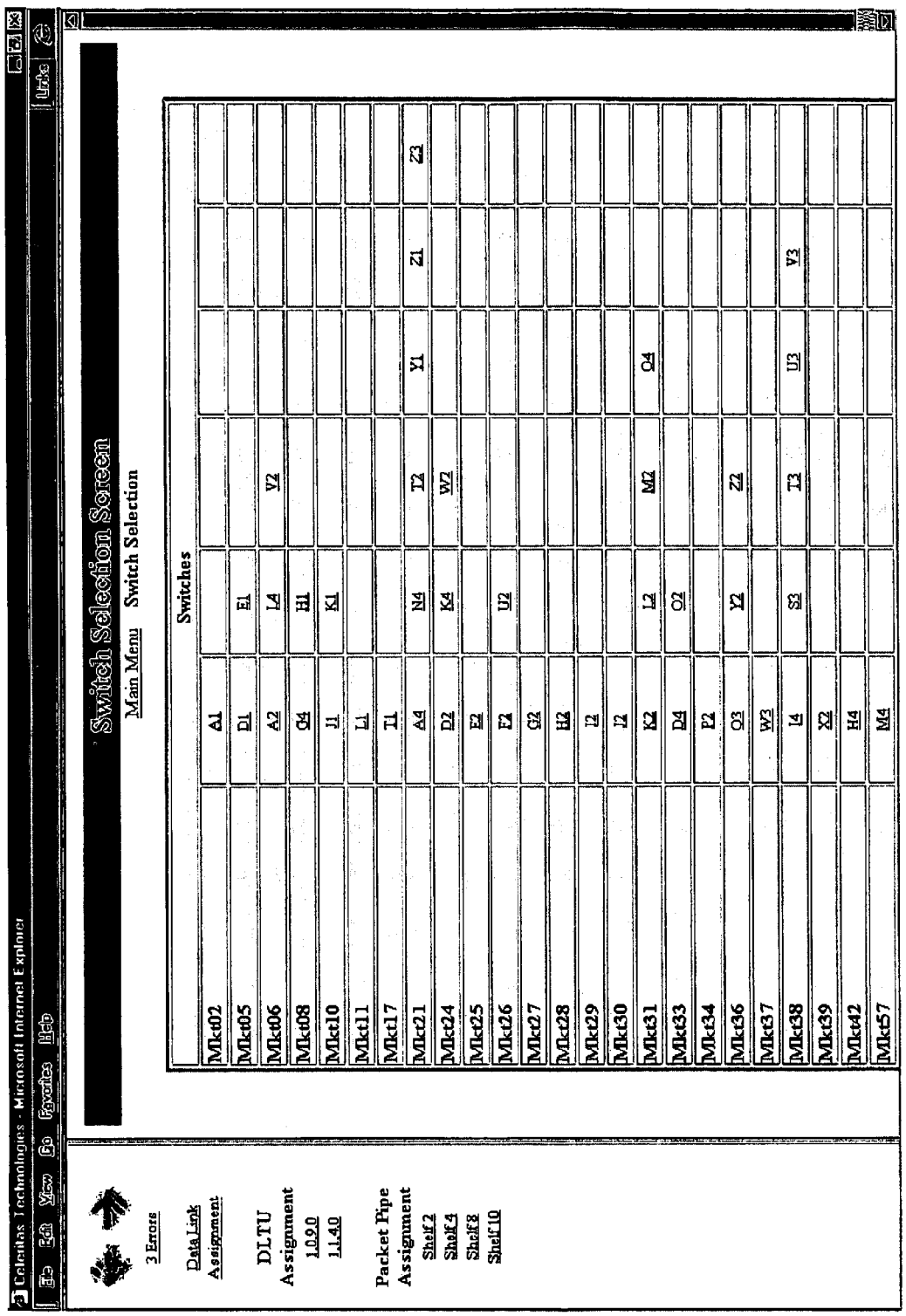
FIG. 17 is a screen view of a switch selection screen in accordance with an embodiment of the present invention.

FIG. 17 depicts an example of a switch selection screen. In the example depicted, switches are grouped by market and, within each market, the switches are grouped by name. A navigation frame is displayed on a portion of the screen. This navigation frame allows a user to navigate through the screens using certain of the navigation components. The navigation frame for the switch selection includes backward and forward links, data link assignments, DLTU assignments, and packet pipe assignments. Also, a user may select a switch from the screen to drill down to or display the selected switch screen. The screen frame includes a link to the menu screen and an identification that the current screen is the switch selection screen. It will be appreciated that additional or other navigation components may be included in the navigation frame.

Figure 18:
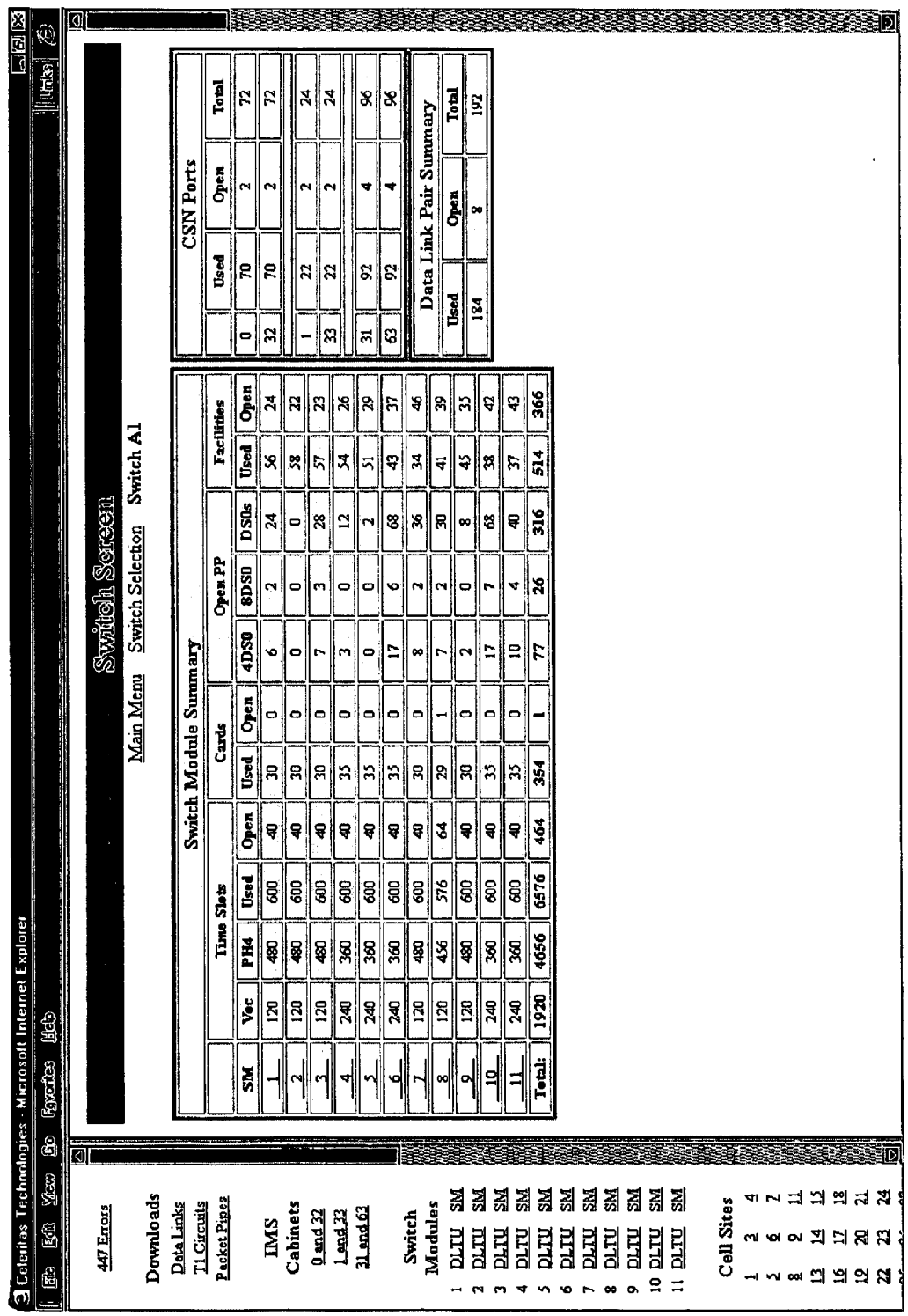
FIG. 18 is a screen view of a switch screen in accordance with an embodiment of the present invention.

FIG. 18 depicts an example of a switch screen. The first portion of the switch screen includes a switch module summary, a CSN ports summary, and a data link pair summary. The switch module summary contains a list of each switch module (SM) with its associated time slots, cards, open packet pipes (PP), and facilities. The time slots indicate the number of voice encoder/decoder (Voc) time slots used, the number of PH4 time slots used, the total number of used Voc and PH4 time slots, and the total number of open and available time slots. The switch module summary also includes the total number of Voc and PH4 cards used on the switch module and the total number of card slots that are open and available. The open PP summary indicates the number of 4 DS0 packet pipes that are available for use on the PH4 cards, the number of 8 DS0 packet pipes that are available for use on the PH4 cards, and the total number of DS0s that are available for use on the PH4 cards. The facilities summary indicates the number of facilities that are in use on the associated switch DLTU and the number of facilities that are open and available for use.

The CSN port summary lists the capacity and usage of the CSN ports, listed by IMS cabinet (such as cabinet 0 and cabinet 32) and grouped by IMS cabinet pair. The CSN port summary indicates the number of CSN ports that are in use (Used), the number of CSN ports that are available and open (Open), and the total number of CSN ports in the ISM cabinet.

The data link pair summary lists the capacity and usage of data link pairs for the switch. The data link pair summary displays the sum of the used ports for all of the IMS cabinets for the switch, divided by 2 (Used), the sum of the open ports for all of the IMS cabinets for the switch, divided by 2 (Open), and the total number of used and open ports for the IMS cabinet for the switch, divided by 2.

FIG. 19 depicts a continuation of the switch screen of FIG. 18. FIG. 19 includes switch module shelf statistics and DLTU facilities statistics. The switch module shelf summary displays switch module shelf statistics for each shelf of the given switch module. The switch module's shelf number (SM Shelf) is displayed in the first column. The time slot summary provides the number of voice encoder/decoder time slots that are used (Voc), the number of PH4 time slots used, the total number of time slots used for the shelf by the Voc and PH4 cards, and the number of available and open time slots for the shelf (Free). The number of card slots used by the shelf (Used) for the Voc and PH4 cards is shown along with the number of free and available card slots. In addition, the packet pipe availability is displayed by groupings of 4 DS0 packet pipes that may be assigned to the shelf (4 PP), the number of 8 DS0 packet pipes that may be assigned to the shelf (8 PP), and the total number of DS0s that may be assigned to the shelf (DS0s).

The DLTU facilities displays a facility statistics for each DLTU shelf, broken down by facility for each selected switch module. The summary includes the DLTU shelf number (Shelf), the DLTU facility number (Fac), the number of facilities/slots that are used for each shelf and facility number (Used), and the number of open facilities/slots for each shelf and facility number (Open).

The switch screen depicted in FIGS. 18 and 19 includes a navigation frame on a portion of the screen so that a user may navigate between different screens and reports to view configuration data and to configure parameters and components. The navigation frame for the switch screen includes navigation components for configuration errors, downloads for data links, T1 circuits and packet pipes, IMS cabinet pairs for the switch, switch modules on the switch, DLTUs for each switch module on the switch, and cell sites assigned to the switch.

In addition, links are provided at the top of the switch screen for the menu screen and the switch selection screen. An identification of the switching being viewed is displayed with the links at the top of the switch screen. It will be appreciated that other navigation components and other links may be displayed in the respective navigation frame portion and screen link and identification portion.

In addition, a user can select any of the switch module numbers depicted in the switch module summary. This causes the system to "drill down" or display more informa-tion about the selected switch module by displaying the switch module screen for the selected switch module. Thus, if a switch module (SM) is selected, such as SM1, the configuration management system 302 would navigate so that the switch module screen is presented to the user.

Figure 20:
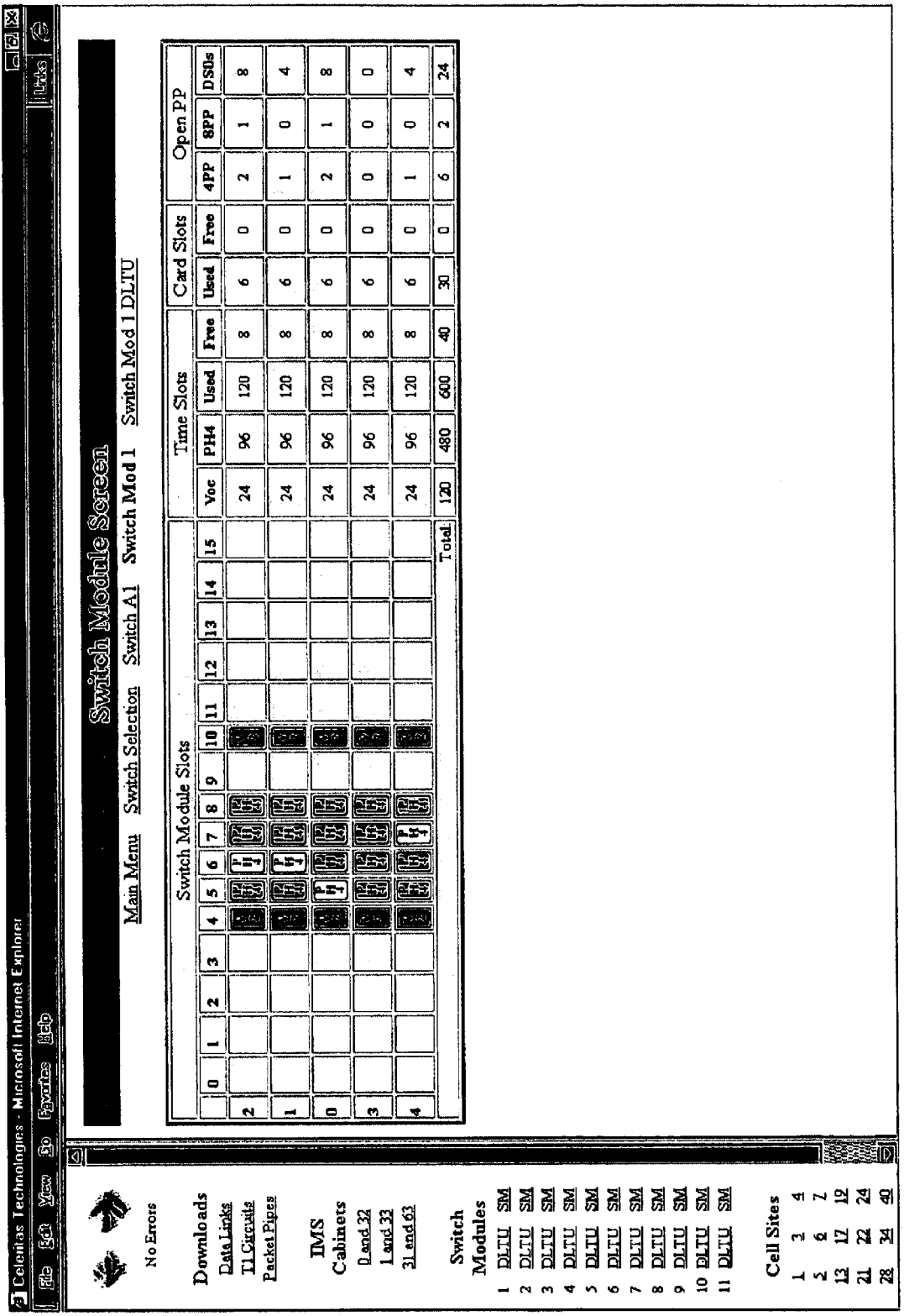
FIG. 20 is a screen view of a switch module screen in accordance with an embodiment of the present invention.

FIG. 20 depicts an example of a switch module screen. The switch module screen displays a configuration for a switch module, including the switch module slots, the time slots, the card slots, and the open packet pipes (PP). The shelf numbers of the switch module are displayed in the left most column. If a switch module slot is used, the type of card that is in the slot is displayed. The card type will either be a V2, V4, or PH4. If a PH4 card has one or more open 4 DS0 packet pipes (PP), then a PH4 open graphic will be displayed, such as white or other light colored graphic. If a PH4 card does to have one or more 4 DS0 PP open, then a PH4 closed graphic will be displayed, such as a dark colored PH4 graphic. The light colored and dark colored PH4 graphics will allow a user to quickly and easily determine whether the PH4 cards have open packet pipes.

The time slots summary displays the number of time slots taken by voice encoder/decoder (Voc) cards and time slots taken by PH4 cards on the shelf. Also shown are the total number of time slots taken (Used) and the total number of cards available and open (Free) on the shelf.

The switch module screen also includes a card slots summary, including the number of cards on the shelf (Used) and the number of cards that may be placed on the shelf (Free). The number of Free card slots takes into account the availability of time slots for those cards.

The number of available and open packet pipes (PP) is depicted. The number of 4DS0 packet pipes available is represented by 4 PP, and the number of 8 DS0 packet pipes available as represented by 8 PP. The total number of available DS0s is depicted by the DS0s column.

The switch module screen includes multiple navigation components and tools. A navigation frame is included in a portion of the screen and includes backward links, downloads for data links, T1 circuits, and packet pipes, the IMS cabinet pair designations, the switch modules (SM), the DLTU for the switch modules, and the cell sites assigned to the PH4 card or the DLTU facility interface for the switch module. Navigation tools in the screen frame allow a user to navigate to the menu, the switch selection screen, the selected switch screen, or the selected switch module DLTU. The selected switch module is identified in the screen frame. In addition, a user may select a PH4 card displayed in the switch module slots portion to drill down to or display the selected switch module PH4 screen.

Figure 21:
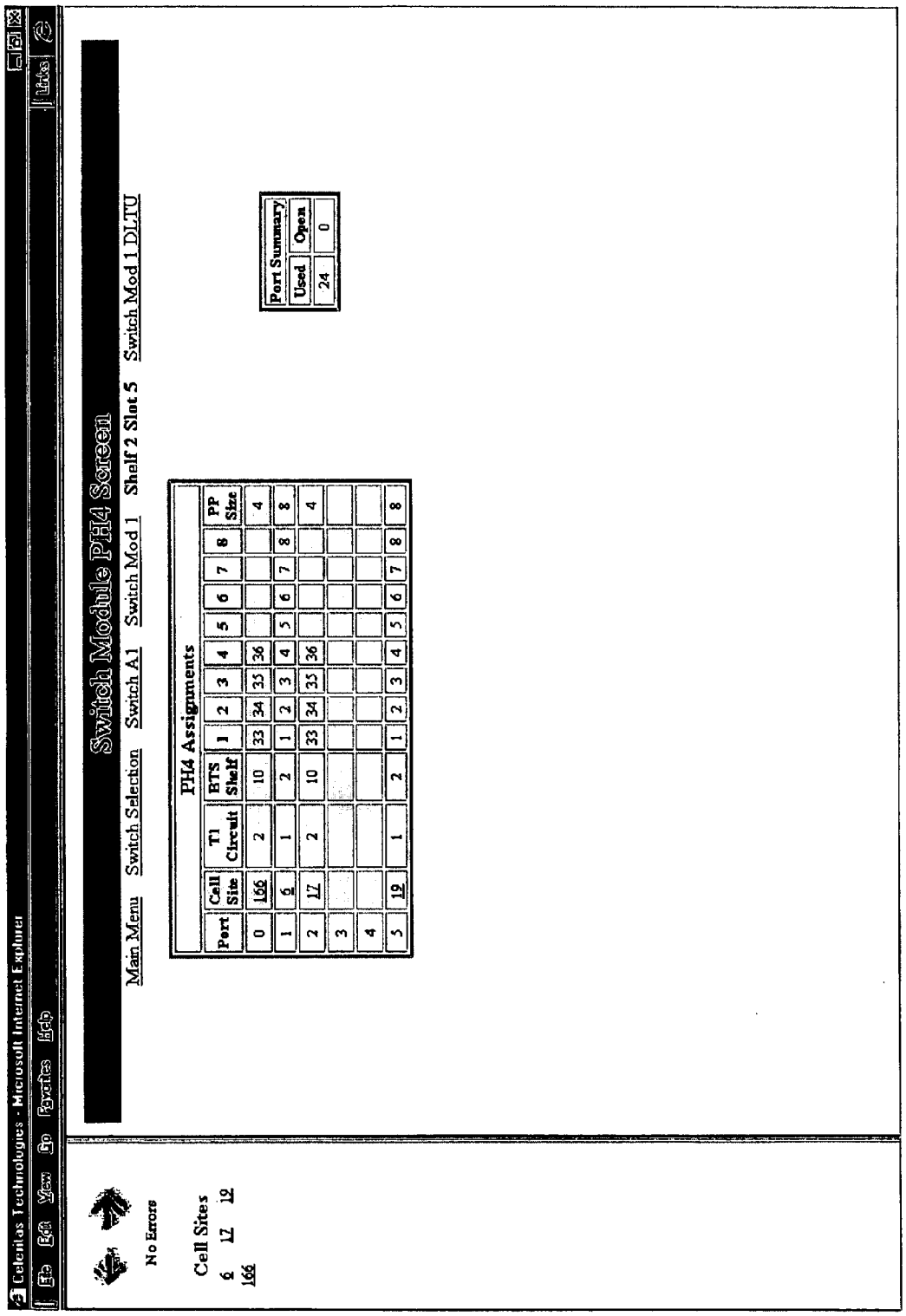
FIG. 21 is a screen view of a switch module packet handler screen in accordance with an embodiment of the present invention.

FIG. 21 depicts an example of a switch module PH4 screen. The switch module PH4 screen displays the configuration for a selected PH4 card. The PH4 assignments include the port number (Port), the cell site number, the T1 circuit to which the packet pipe is assigned, the BTS shelf from which the T1 packet pipe originated, the DS0 assignments for the packet pipes terminating at the selected PH4 port (as indicated by the column headings 1–8), and the size of the packet pipe terminating at the selected PH4 card (PP Size).

The switch module PH4 screen also includes a port summary. The port summary displays the total amount of DS0s that are in use (Used) and the total number of DS0s that are available (Open).

The switch module PH4 screen includes multiple navigation components and tools. A navigation frame has navigation components, such as backward and forward links, an identification of configuration errors, and links to the cell sites that are assigned to the selected PH4 card. In addition, navigation tools are provided in the screen frame for links to the main menu, the switch selection screen, the switch screen for the selected switch, the selected switch module, and the DLTU associated with the selected switch module. The switch module shelf and slot are identified at the top of the screen. Also, a user may select a particular cell site in the PH4 assignment summary to drill down to or display the cell site screen associated with the selected cell site.

Figure 22:
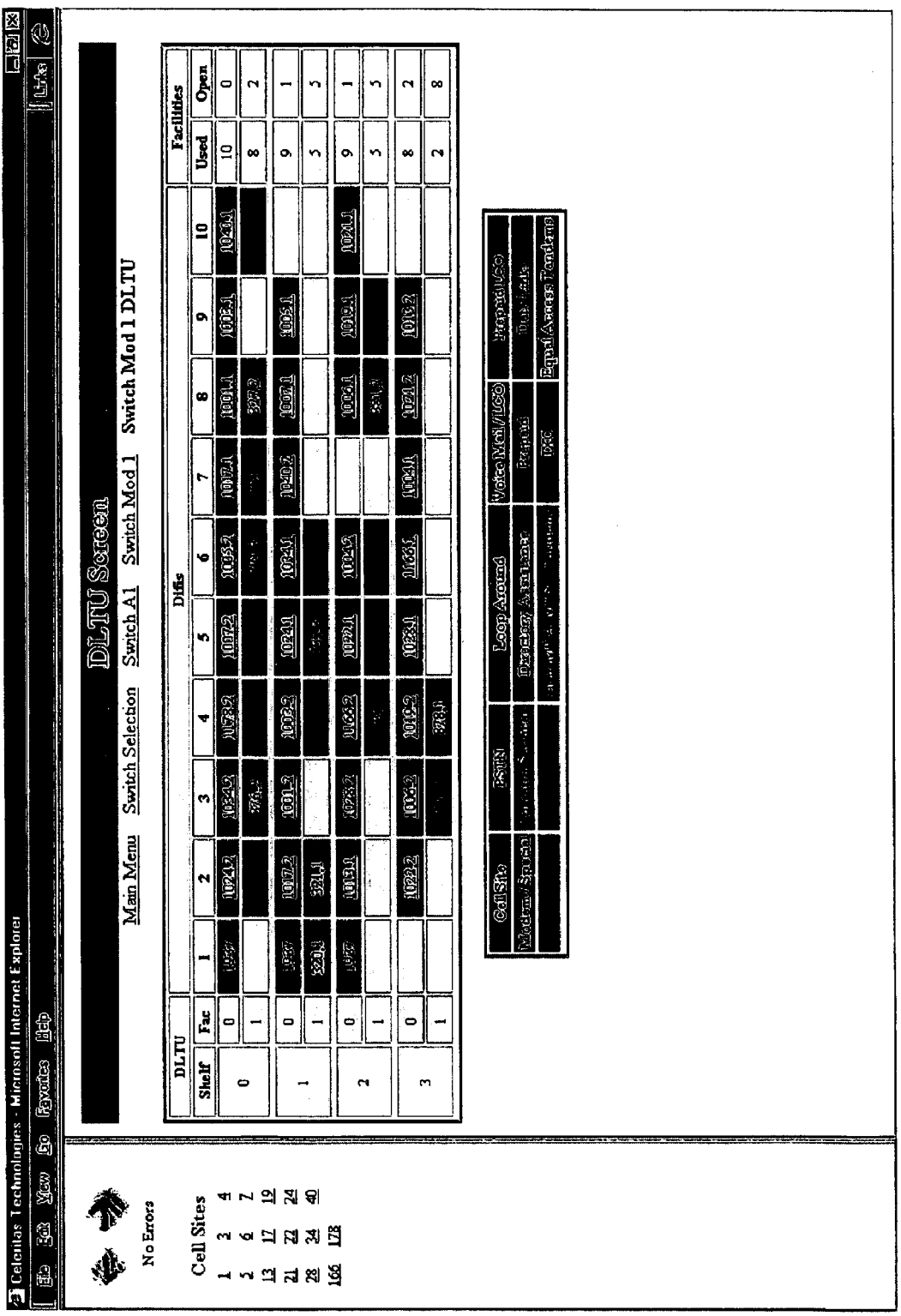
FIG. 22 is a screen view of a digital link trunk unit screen in accordance with an embodiment of the present invention.

FIG. 22 depicts an example of a DLTU screen. The DLTU screen displays configuration data for a switch module's DLTU. The DLTU screen includes the shelf number (Shelf), a facility of a DFI card (Fac), the slot position for the DFI card (Difis), and the trunk groups that are assigned to a specific shelf, slot, and facility (represented by the numbers 1–10). Different services are depicted using different shades of gray. In addition, the total number of used and open facilities are displayed.

Multiple navigation components and tools are included. A navigation frame provides backward and forward links, a list of configuration errors, an identification of the cell sites that have T1 circuits terminating on the DLTU of the selected switch module, and links to the cell site screens for the listed cell sites. In addition, links in the screen frame allow a user to navigate to the menu, the switch selection screen, the selected switch, and the selected switch module. The selected switch module and the DLTU are identified at the top of the screen.

Figure 23:
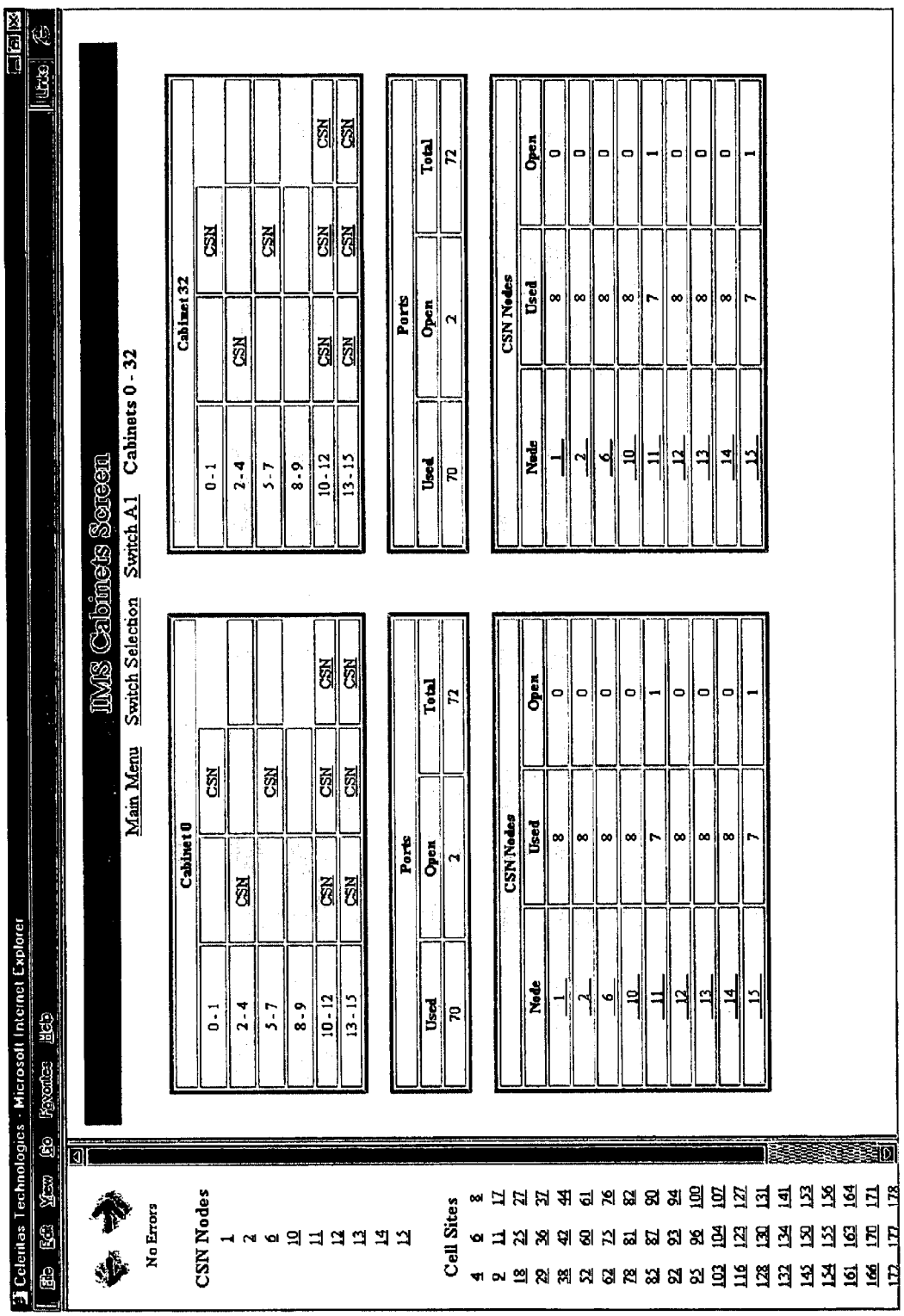
FIG. 23 is a screen view of an IMS screen in accordance with an embodiment of the present invention.

FIG. 23 depicts an example of an IMS cabinet screen. The IMS cabinet screen displays a configuration for a pair of IMS cabinets. The IMS cabinet screen displays the cabinet number and whether a CSN node is located within the cabinet. If a CSN node is located in the cabinet, the CSN is displayed for the location indicated by the node number range listed in the left most column of the cabinet summary. For example, cabinet 0, node 1 has a CSN.

The ports summary displays the number of ports that are used, the number of ports that are open, and the total number of ports. The CSN nodes summary displays the number of used ports and the number of open ports for each CSN node that is used on the IMS cabinet.

The IMS cabinet screen includes multiple navigation components and tools. A navigation frame has backward and forward links, an identification of configuration errors, a listing of the CSN nodes that are used and links to those CSN nodes, and a list of cell sites whose data links are connected to either of the IMS cabinet pairs and links to those cell sites. In addition, links in the screen frame allow a user to navigate between the menu, the switch selection screen, and the selected switch. Also, a user may select a particular CSN to drill down to or display the CSN node screen for the selected CSN node. A user also may select a node under the CSN node summary to drill down to or display the CSN node screen for the selected CSN node.

Figure 24:
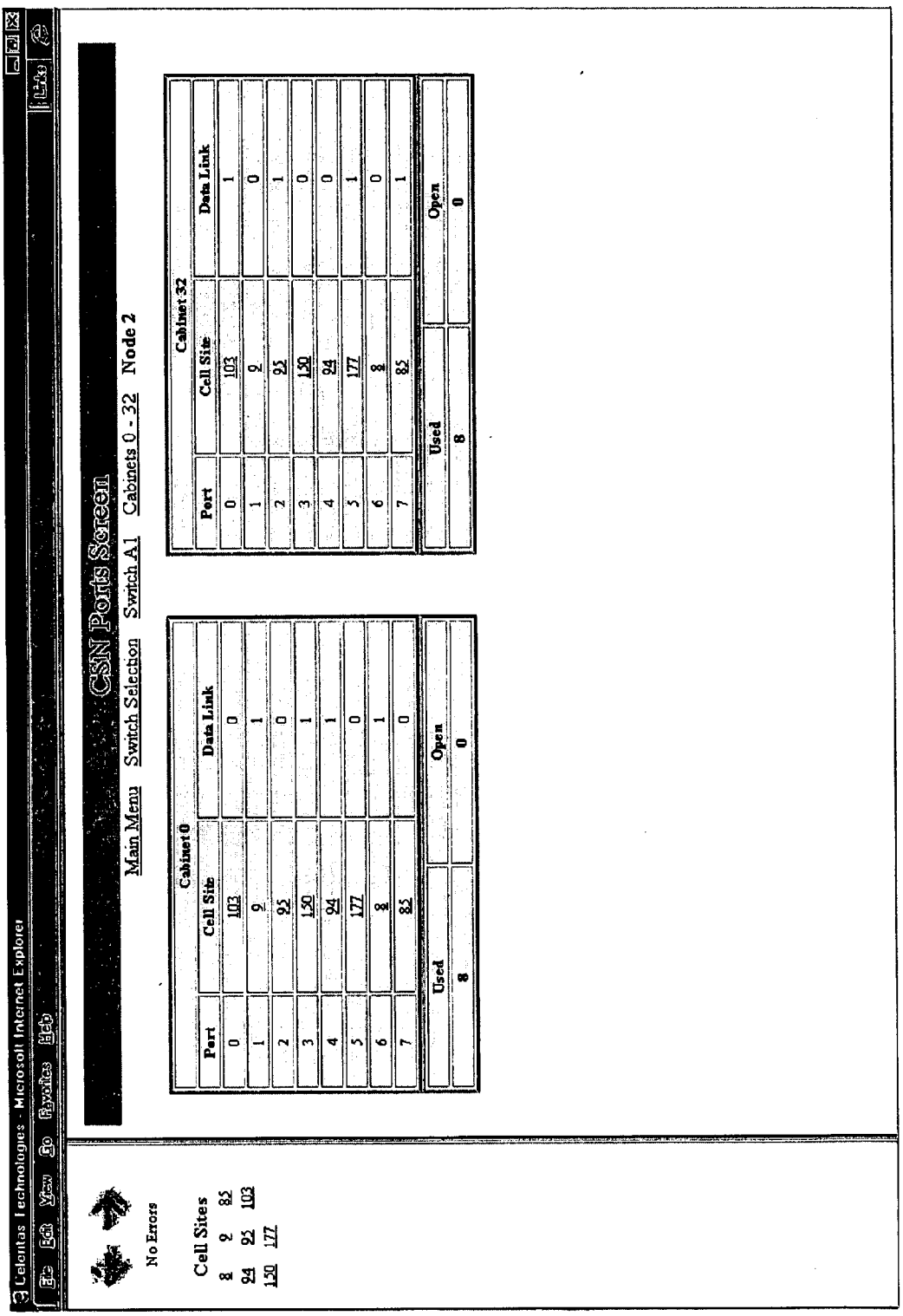
FIG. 24 is a screen view of a cell site node ports screen in accordance with an embodiment of the present invention.

FIG. 24 depicts a CSN port screen. The CSN port screen displays a configuration for a pair of CSN nodes. The CSN port screen displays an IMS cabinet pair for the selected CSN node. The port number of the selected CSN node, the cell site number whose data links are connected to the selected CSN node, and the data link number that is assigned to the CSN port are displayed for each cabinet pair of the selected node. Also displayed are the number of used ports for the CSN node and the number of open ports for the CSN node.

A navigation frame includes components for backward and forward links, configuration errors, a list of cell sites whose data links are connected to either CSN node, and links to the listed cell sites. Links are included in the screen frame so that a user may navigate to the main menu, the switch selection screen, the selected switch screen, or the IMS cabinet screen associated with the selected node. Also, a user may select one of the cell sites to drill down to or display the cell site screen for the selected cell site.

Figure 25:
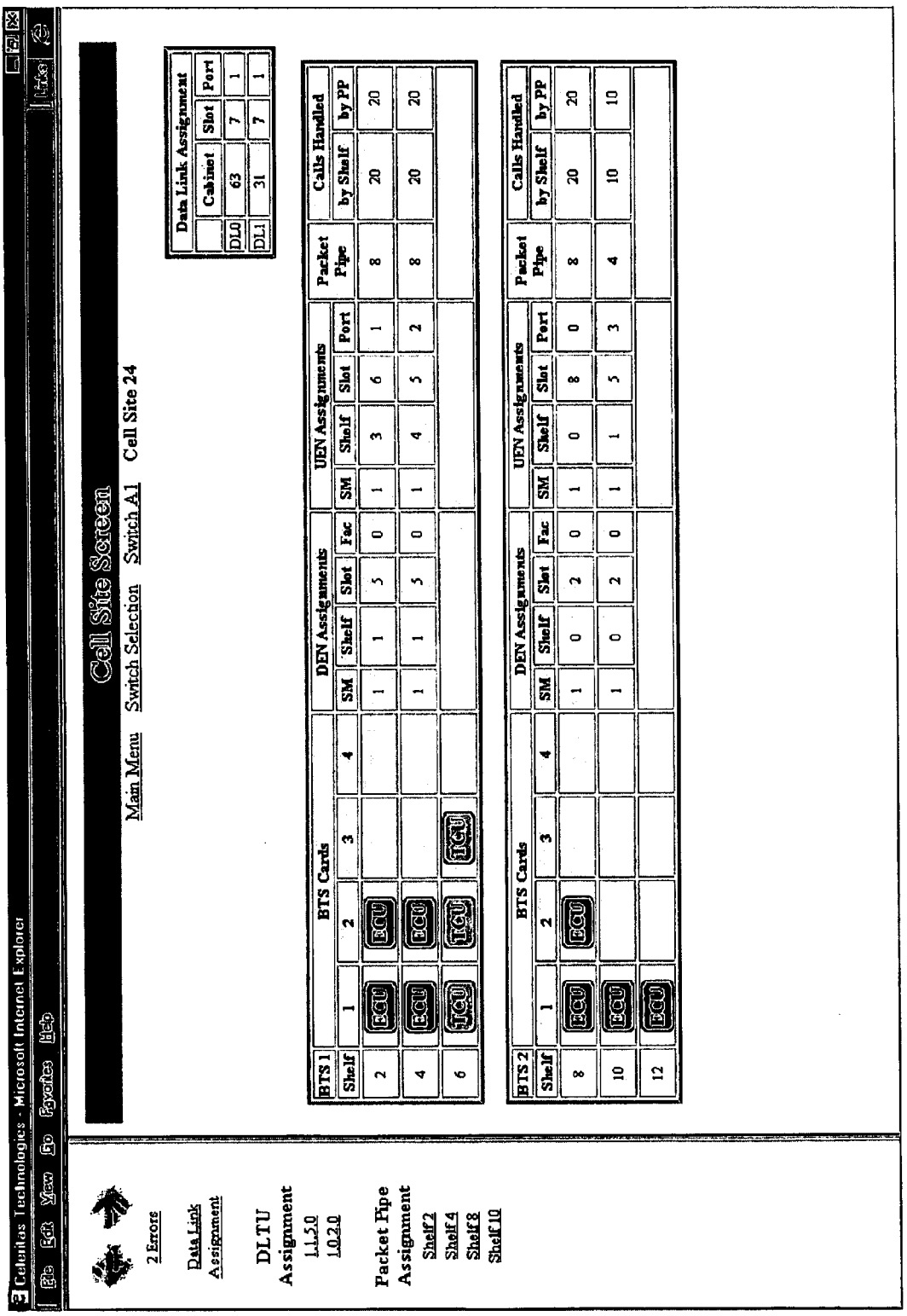
FIG. 25 is a screen view of a cell site screen in accordance with an embodiment of the present invention.

FIG. 25 depicts an example of a cell site screen. The cell site screen displays a configuration for the cell site as well as the BTS shelf and card configuration, the T1 and packet pipes assignments, and call capacity. A data link assignment summary provides configuration information for the DL0 and DL1 data links. The data link assignment displays the cabinet number, the slot number, and the CSN port for each data link.

The BTS configuration data includes the BTS shelf number and an identification of whether an ECU card, a TCU card, or nothing is located in each BTS card slot. The T1 circuit assignment on the DLTU will be displayed if the BTS shelf contains a packet pipe. The DEN assignments are displayed by switch module (SM) shelf, slot, and facility (Fac). The UEN assignments are displayed by switch module (SM), shelf, slot, and port. If a BTS shelf contains a packet pipe, the size of the packet pipe is displayed under the packet pipe column. If a BTS shelf contains a packet pipe, the number of calls handled will be displayed by shelf and by packet pipe (PP). If the BTS shelf contains an 8 DS0 packet pipe, twenty calls can be handled. If the BTS shelf contains a 4 DS0 packet pipe, ten calls can be handled. The cell site screen will display all BTSs for the cell site.

The cell site screen includes multiple navigation components and tools. The navigation frame provides backward and forward links, identification of configuration errors, data link assignments, DLTU assignments, and packet pipe assignments. Links are provided in the navigation frame for each of those items. The screen frame provides links for navigation to the main menu, the switch selection screen, and the selected switch screen. The selected cell site is identified at the top of the screen.

Those skilled in the art will appreciate that variations from the specific embodiments disclosed above are contemplated by the invention. The invention should not be restricted to the above embodiments, but should be measured by the following claims.

What is claimed is:

1. A system for managing a cell network having a plurality of components of a cell site complex comprising:

a data reception and storage system remote from the cell site complex components configured to receive configuration data for a plurality of parameters of the cell site complex components, to analyze the configuration data to determine if a configuration identified by the configuration data violates at least one configuration rule for at least one of the parameters of at least one of the cell site complex components, and, if a violation of the at least one configuration rule is identified, to report the violation; and a user interface configured to generate for display the configuration data for the parameters of the cell site complex components, to enable navigation through the configuration data, to enable selection of selected configuration data for display, and, if the violation of the at least one configuration rule is identified, to receive the report of the violation from the data reception and storage system and to generate for display the report.

2. The system of claim 1 wherein at least one of the cell site complex components comprises at least one member selected from a group comprising a configuration data and alarms element, a switch, a processor, a digital trunk interface, a switching unit, and a network element.

3. The system of claim 1 wherein the at least one configuration rule violation comprises at least one member selected from a group comprising assigning more than a single digital signal zero group from a same digital signal one group to terminate at a same location of a switching unit, assigning the digital signal zero group to a control component of a base transceiver, and assigning a digital signal zero group of insufficient size to carry a communication between the base transceiver and a switch.

4. The system of claim 1 wherein the data reception and storage system comprises a load table configured to retain static configuration data from a current configuration.

5. The system of claim 1 further comprising a workstation configured to receive the configuration data.

6. The system of claim 5 further comprising a browser configured to operate on the workstation and to generate the configuration data for display.

7. The system of claim 1 wherein:
the data reception and storage system further is configured to parse the configuration data to basic components for storage; and
the system further comprises a database configured to store the basic components of the configuration data.

8. A user interface for managing a cell network having at least one component of a cell site complex comprising:
a screen module configured to generate configuration data for the cell site complex component for display in a screen frame;
a configuration module configured to enable entry of new configuration data for a new configuration of a parameter of the cell site complex component, and, when new configuration data is entered, to receive and process the new configuration data to determine the new configuration and to analyze the new configuration data to determine if the new configuration violates a configuration rule for the cell site complex component; and
a navigation module configured to generate a navigation frame with a navigation tool and a navigation component, wherein the navigation tool and the navigation component are configured to navigate through the configuration data and the new configuration data;
wherein the user interface is remote from the cell site complex component.

9. The system of claim 8 wherein the navigation component comprises a selectable screen component that represents the at least one cell site complex component and wherein the navigation module is configured to generate display data having other configuration data when the selectable screen component is selected.

10. The system of claim 8 further comprising a report interface module configured to generate at least one member of a group comprising a configuration error report and a data load error report.

11. The system of claim 8 wherein the screen module is configured to generate configuration data for a switch and to receive other configuration data for the switch.

12. The system of claim 8 wherein the screen module enables selection of a member selected from a group comprising a switch option, a processor option, a switching unit option, a digital trunk interface option, a cell site option, a base transceiver option, a channel unit option, a control channel option, a control channel assignments option, and a dedicated assignments option.

13. The system of claim 8 wherein the screen module enables selection of a member selected from a group comprising a switch configuration option, a switch selection option, a cellular processor option, an interprocess message switch cabinet option, a cell site node port option, a digital link trunk unit option, a switch module option, a packet handler option, a voice encoder/decoder option, a cell site option, a base transceiver station option, a channel unit option, a BTS shelf option, a BTS card option, a TCU option, and an ECU option.

14. The system of claim 8 wherein the screen module enables selection of a member selected from a group comprising a switch option, a processor option, a switching unit option, a digital trunk controller option, a cell site option, a channel element option, a BSC option, and an SBS shelf option.

15. The system of claim 8 wherein the screen module is configured to generate configuration data for at least one member of a group comprising a switch, a processor, a switching unit, a digital trunk interface, a cell site, a base transceiver, a channel unit, a control channel, a control channel assignments, and a dedicated assignments.

16. The system of claim 8 wherein the screen module is configured to generate configuration data for at least one member of a group comprising a switch, a cellular processor, an interprocess message switch cabinet, a cell site node port, a digital link trunk unit, a switch module, a packet handler, a voice encoder/decoder, a cell site, a base transceiver station, a channel unit, a BTS shelf, a BTS card, a TCU, and an ECU.

17. The system of claim 8 wherein the screen module is configured to generate configuration data for at least one member of a group comprising a switch, a processor, a switching unit, a digital trunk controller, a cell site, a channel element, a BSC, and an SBS shelf.

18. The system of claim 8 wherein the cell site complex is configured to perform at least one member of a group comprising transmit a wireless communication and receive another wireless communication.

19. The system of claim 8 further comprising a workstation configured to receive the configuration data.

20. The system of claim 19 further comprising a browser configured to operate on the workstation and to generate a page with the configuration data.

21. A method for managing a cell network having at least one component of a cell site complex comprising:
collecting configuration data for at least one parameter of the cell site complex component;
generating the configuration data for display and entry data for entry of new configuration data;
receiving from a location remote from the cell site complex component signaling having new configuration data for a new configuration of the cell site complex component;
processing the signaling with a processor to determine the new configuration from the new configuration data and to determine if the new configuration violates at least one configuration rule for the cell site complex component; and
generating new signaling for the new configuration to effect the new configuration for the cell site complex component if the new configuration does not violate the at least one configuration rule.

22. The method of claim 21 wherein the cell site complex component comprises at least one member selected from a group comprising a configuration data and alarms element, a switch, a processor, a digital trunk interface, a switching unit, and a network element.

23. The method of claim 21 wherein a violation of the at least one configuration rule comprises at least one member selected from a group comprising assigning more than a single digital signal zero group from a same digital signal one group to terminate at a same location of a switching unit, assigning the digital signal zero group to a control component of a base transceiver, and assigning a digital signal zero group of insufficient size to carry a communication between the base transceiver and a switch.

24. The method of claim 21 further comprising loading configuration data to a load table configured to retain static configuration data from a current configuration.

25. The method of claim 21 further comprising storing the new configuration data in a temporary load table until the new configuration data can be analyzed to determine if the new configuration violates the at least one configuration rule.

26. The method of claim 21 further comprising transmitting the signaling containing the new configuration data from a workstation.

27. The method of claim 21 further comprising receiving other signaling containing the configuration data at a workstation.

28. The method of claim 27 further comprising displaying the configuration data using a browser.

29. The method of claim 21 wherein the signaling comprises internet protocol signaling.

30. The method of claim 31 further comprising parsing the configuration data to basic components for storage and storing the basic components of the configuration data in a database.

31. A method for managing a cell network having at least one compound of a cell site complex comprising:

collecting configuration data for a plurality of parameters of the cell site complex component;

determining if at least some configuration data violates at least one configuration rule for at least one of the plurality of parameters of the cell site coplex component;

generating signal for generating a first graphical interface representation of a first configuration of at least a first parameter of the cell site complex component, the signaling comprising first configuration data, first display data for displaying the first configuration data, first navigation data for navigating through the first configuration data, and if the at least some configuration data violates the at least one configuration rule, first configuration rule violation data;

receiving return signaling requesting a navigation for display of second configuration data;

processing the return signaling in a processor remote from the cell site complex component;

determining if at least some second configuration data violates the at least one configuration rule for at the least one of the plurality of parameters of the cell site complex component; and generating new signaling for generating a second graphical interface representation of the second configuration data, second display data for displaying the second configuration data, second navigation data for navigating through the second configuration data, and if the at least some second configuration data violates the at least one configuration rule, second configuration rule violation data.

32. The method of claim 31 wherein the configuration data comprises at least one member of a group comprising switch configuration data, processor configuration data, switching unit configuration data, digital trunk interface configuration data, cell site configuration data, base transceiver configuration data, channel unit configuration data, control channel configuration data, control channel assignments configuration data, and dedicated assignments configuration data.

33. The method of claim 31 wherein the configuration data comprises at least one member of a group comprising switch configuration data, cellular processor configuration data, interprocess message switch cabinet configuration data, cell site node port configuration data, digital link trunk unit configuration data, switch module configuration data, packet handler configuration data, voice encoder/decoder configuration data, cell site configuration data, base transceiver station configuration data, channel unit configuration data, BTS shelf configuration data, BTS card configuration data, TCU configuration data, and ECU configuration data.

34. The method of claim 31 wherein the configuration data comprises at least one member of a group comprising switch configuration data, processor configuration data, switching unit configuration data, digital trunk controller configuration data, cell site configuration data, channel element configuration data, base station controller configuration data, and selection back subsystem shelf configuration data.

35. The method of claim 31 wherein the cell site complex is configured to perform at least one member of a group comprising transmit a wireless communication and receive another wireless communication.

36. The method of claim 31 further comprising transmitting the second signaling containing the second configuration data from a workstation.

37. The method of claim 31 further comprising receiving the first signaling containing the first configuration data at a workstation.

38. The method of claim 37 further comprising displaying the first display data using a browser.

* * * * *

UNITED STATES PATENT AND TRADEMARK OFFICE
CERTIFICATE OF CORRECTION

| | | |
|---|---|---|
| PATENT NO. | : 6,725,032 B1 | Page 1 of 1 |
| APPLICATION NO. | : 09/414746 | |
| DATED | : April 20, 2004 | |
| INVENTOR(S) | : Joseph Allen Sheridan and John Kenneth Woods | |

It is certified that error appears in the above-identified patent and that said Letters Patent is hereby corrected as shown below:

At Column 25, line 30 of the Patent, change "31" to --21--.

At Column 25, line 35 of the Patent, change "compound" to --component--.

At Column 25, line 40 of the Patent, change "coplex" to --complex--.

At Column 25, line 42 of the Patent, change "generating signal" to --generating signaling--.

At Column 26, line 2 of the Patent, change "at the least" to --the at least--.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 6,725,032 B1  
APPLICATION NO. : 09/414746  
DATED : April 20, 2004  
INVENTOR(S) : Joseph Allen Sheridan and John Kenneth Woods Page 1 of 1

It is certified that error appears in the above-identified patent and that said Letters Patent is hereby corrected as shown below:

At Column 25, line 30, change "31" to --21--.

At Column 25, line 35, change "compound" to --component--.

At Column 25, line 40, change "coplex" to --complex--.

At Column 25, line 42, change "generating signal" to --generating signaling--.

At Column 26, line 2, change "at the least" to --the at least--.

Signed and Sealed this

Twenty-fifth Day of December, 2007

JON W. DUDAS  
*Director of the United States Patent and Trademark Office*